(12) United States Patent
Nagai et al.

(10) Patent No.: US 11,971,342 B2
(45) Date of Patent: Apr. 30, 2024

(54) SAMPLE PREPARATION APPARATUS, SAMPLE PREPARATION SYSTEM, SAMPLE PREPARATION METHOD, AND PARTICLE ANALYZER

(71) Applicant: SYSMEX CORPORATION, Kobe (JP)

(72) Inventors: Takaaki Nagai, Kobe (JP); Shinichiro Oguni, Kobe (JP); Tomohiro Tsuji, Kobe (JP)

(73) Assignee: SYSMEX CORPORATION, Hyogo (JP)

( * ) Notice: Subject to any disclaimer, the term of this patent is extended or adjusted under 35 U.S.C. 154(b) by 0 days.

(21) Appl. No.: 17/543,415

(22) Filed: Dec. 6, 2021

(65) Prior Publication Data

US 2022/0091016 A1    Mar. 24, 2022

Related U.S. Application Data

(63) Continuation of application No. 15/992,524, filed on May 30, 2018, now Pat. No. 11,226,279.

(30) Foreign Application Priority Data

May 31, 2017    (JP) .................. 2017-108841

(51) Int. Cl.
   *G01N 15/14*    (2006.01)
   *G01N 1/38*    (2006.01)
   (Continued)

(52) U.S. Cl.
   CPC ........... *G01N 15/1404* (2013.01); *G01N 1/38* (2013.01); *G01N 1/4077* (2013.01);
   (Continued)

(58) Field of Classification Search
   CPC .......... G01N 15/1404; G01N 15/1436; G01N 15/1459; G01N 1/38; G01N 1/4077;
   (Continued)

(56) References Cited

U.S. PATENT DOCUMENTS

| | | | |
|---|---|---|---|
| 5,560,889 | A | 10/1996 | Ogino |
| 6,350,619 | B1 | 2/2002 | Mercolino et al. |

(Continued)

FOREIGN PATENT DOCUMENTS

| | | |
|---|---|---|
| CN | 1928565 A | 3/2007 |
| CN | 101126762 A | 2/2008 |

(Continued)

OTHER PUBLICATIONS

The Chinese Office Action issued on Sep. 24, 2020 in a counterpart Chinese patent application No. 201810531921.9.

(Continued)

*Primary Examiner* — Jennifer Wecker
*Assistant Examiner* — Kathryn Elizabeth Limbaugh
(74) *Attorney, Agent, or Firm* — Crowell & Moring LLP

(57) ABSTRACT

The sample preparation apparatus includes a measurement unit configured to measure a sample containing particles acquired from a sample container and detect measurement target particles in the sample, a sample preparation unit capable of adjusting the concentration of measurement target particles in a sample acquired from a sample container and configured to prepare a measurement sample by mixing a sample and any of a plurality of types of particle detection reagents including a particle labeling substance, and a control unit for controlling the sample preparation unit so as to generate concentration information of the measurement target particles in the sample in the sample container based on the measurement data of the measurement unit and adjust the concentration of the measurement target particles in the (Continued)

sample acquired from the sample container according to the generated concentration information and the type of particle detection reagent used for preparing the measurement sample.

20 Claims, 18 Drawing Sheets

(51) Int. Cl.
*G01N 1/40* (2006.01)
*G01N 15/10* (2006.01)
*G01N 15/1404* (2024.01)
*G01N 15/1434* (2024.01)
*G01N 35/00* (2006.01)
*G01N 35/10* (2006.01)

(52) U.S. Cl.
CPC ..... *G01N 15/1436* (2013.01); *G01N 15/1459* (2013.01); *G01N 35/1002* (2013.01); *G01N 2001/386* (2013.01); *G01N 2001/4083* (2013.01); *G01N 2015/1006* (2013.01); *G01N 2035/00495* (2013.01)

(58) Field of Classification Search
CPC ......... G01N 35/1002; G01N 2001/386; G01N 2001/4083; G01N 2015/1006; G01N 2035/00495
See application file for complete search history.

(56) References Cited

U.S. PATENT DOCUMENTS

| | | | |
|---|---|---|---|
| 8,189,177 | B2 | 5/2012 | Fukuda et al. |
| 9,618,363 | B2 | 4/2017 | Oda et al. |
| 9,957,554 | B1 | 5/2018 | Wu |
| 11,226,279 | B2 | 1/2022 | Nagai et al. |
| 2002/0086431 | A1 | 7/2002 | Markham et al. |
| 2006/0134728 | A1 | 6/2006 | MacDonald et al. |
| 2008/0072664 | A1 | 3/2008 | Hansen et al. |
| 2008/0240991 | A1 | 10/2008 | Wakamiya et al. |
| 2015/0218628 | A1 | 8/2015 | Hanashi |
| 2016/0215324 | A1 | 7/2016 | Srinivasan et al. |

FOREIGN PATENT DOCUMENTS

| | | |
|---|---|---|
| CN | 101275961 A | 10/2008 |
| CN | 101542263 A | 9/2009 |
| CN | 101661045 A | 3/2010 |
| CN | 102192995 A | 9/2011 |
| CN | 102221606 A | 10/2011 |
| CN | 102338733 A | 2/2012 |
| CN | 103105352 A | 5/2013 |
| CN | 103621564 A | 3/2014 |
| CN | 104736999 A | 6/2015 |
| CN | 105158221 A | 12/2015 |
| CN | 105866105 A | 8/2016 |
| CN | 106062557 A | 10/2016 |
| JP | H4-151541 | 5/1992 |
| JP | H7-301586 | 11/1995 |
| JP | 2001-083165 | 3/2001 |
| JP | 2001-091519 | 4/2001 |
| JP | 2007-093356 | 4/2007 |
| JP | 2010-505116 A | 2/2010 |
| JP | 4814719 | 11/2011 |
| JP | 2012-107985 A | 6/2012 |
| JP | 2012-223098 A | 11/2012 |
| JP | 2012-235743 A | 12/2012 |
| JP | 5441888 | 3/2014 |
| JP | 5738616 | 6/2015 |
| JP | 2016-206185 A | 12/2016 |
| JP | 2016-217888 A | 12/2016 |
| WO | WO 2009/122999 | 7/2011 |
| WO | WO 2016/016345 A1 | 2/2016 |

OTHER PUBLICATIONS

The Japanese Office Action issued on Feb. 24, 2021 in a counterpart Japanese patent application No. 2017-108841.
The Communication pursuant to Article 94(3) EPC issued on Apr. 20, 2021 in a counterpart European patent application No. 18174542.3.
The Japanese Decision of Refusal issued on Jul. 6, 2021 in a counterpart Japanese patent application No. 2017-108841.
The Rejection Decision issued on Jul. 5, 2021 in a counterpart Chinese patent application No. 201810531921.9.
Examination Report, dated Feb. 8, 2023, pp. 1-3, issued in Australian patent application No. 2018203450, IP Australia, Woden ACT.
U.S. Non-Final Office Action, dated Jan. 4, 2021, pp. 1-29, issued in U.S. Appl. No. 15/992,524; Listed in the Examination Report issued on Feb. 8, 2023 in a counterpart Australian patent application, United States Department of Commerce, Alexandria, Virginia.
The Notification of Reexamination issued on Aug. 3, 2023 in a counterpart Chinese patent application No. 201810531921.9.
The Notice of Reasons for Refusal issued on Sep. 19, 2023 in a counterpart Japanese patent application No. 2022-188730.
The Chinese Reexamination Decision issued on Dec. 27, 2023 in a counterpart Chinese patent application No. 201810531921.9.

| Exam item ID | A | | | |
|---|---|---|---|---|
| Exam item name | Regulatory T cells | | | |
| Cell detection reagent ID | 1 | 2 | 3 | 4 |
| Cell detection reagent name | Nuclear stain | CD25 | T cell surface marker cocktail antibody reagent | FoxP3 |
| Measurement item | Nucleus | CD25 | CD3 | CD4 | FoxP3 |
| Fluorescent substance type | Hoechst 33342 | PE | FITC | PC7 | Alexa 647 |
| Sample type | Peripheral blood | | | |
| Leukocytes required for exam item | 10,000 particles | | | |
| Measurement target cell ratio | Peripheral blood total leukocytes  about 10% | | | |
| Sample amount | 10μl | | | |
| Exam item ID | 5μl | 10μl | 5μl | 10μl |
| Cell detection reagent addition order | Hemolytic agent → Cell detection reagent 2 → Cell detection reagent 3 → Cell membrane penetrating Agent (10 μl) → Cell detection reagent 4 → Cell detection reagent 1 | | | |
| Required cells for each cell detection reagent | 1000 | 5000 | 1000 | 10000 |

FIG. 13A

| Exam item ID | A | | | | | | | |
|---|---|---|---|---|---|---|---|---|
| Exam item name | Regulatory T cell | | | | | | | |
| Measurement sample No. | 1 | | 2 | | 3 | | 4 | |
| Cell detection reagent ID | 1 | 2 | 1 | 3 | 1 | 4 | 1 | 5 |
| Cell detection reagent name | Nuclear stain | CD25 | Nuclear stain | CD3 | Nuclear stain | CD4 | Nuclear stain | FoxP3 |
| Measurement item | Nucleus | CD25 | Nucleus | CD3 | Nucleus | CD4 | Nucleus | FoxP3 |
| Fluorescent substance type | Hoechst33342 | PE | Hoechst33342 | FITC | Hoechst33342 | PC7 | Hoechst33342 | Alexa647 |
| Sample type | Peripheral blood | | | | | | | |
| Leukocytes required for each cell detection reagent | 1000 | 5000 | 1000 | 1000 | 1000 | 1000 | 1000 | 10000 |
| Peripheral blood total leukocyte target cell ratio | 20% | | 30% | | 30% | | 10% | |
| Sample amount | 10 μl | | | | | | | |
| Amount added cell detection reagent relative to sample amount at left | 5 μl | 10 μl | 5 μl | 5 μl | 5 μl | 5 μl | 5 μl | 10 μl |
| Other reagent (non-cell detection reagent) type and dispensing amount | Hemolytic agent 5 μl | / | Hemolytic agent 5 μl | / | Hemolytic agent 5 μl | / | Hemolytic agent 5 μl | Membrane penetrant 10 μl |
| Priority order when insufficient cells available | 2 | | 4 | | 3 | | 1 | |

FIG. 13B

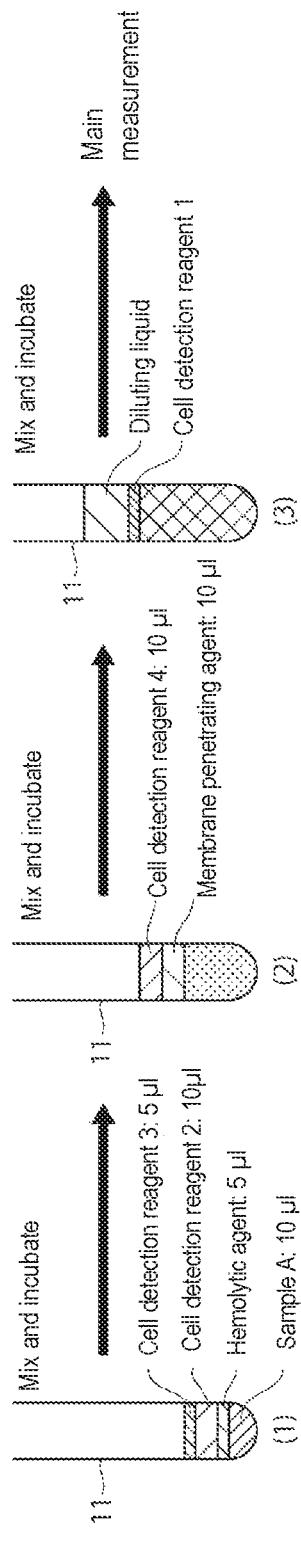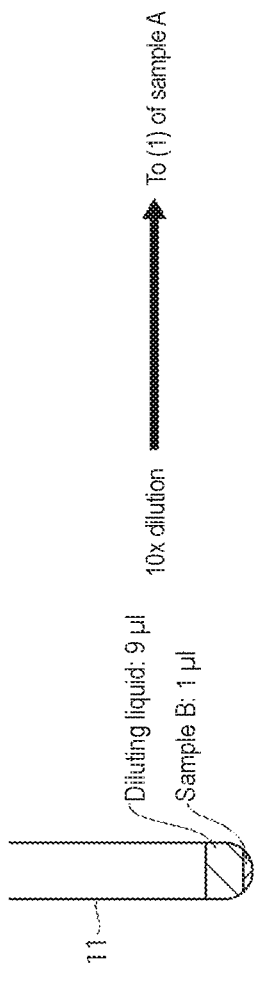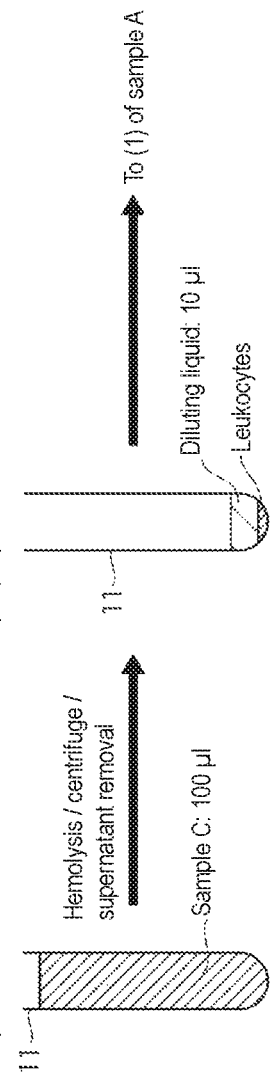
FIG. 15

SAMPLE PREPARATION APPARATUS, SAMPLE PREPARATION SYSTEM, SAMPLE PREPARATION METHOD, AND PARTICLE ANALYZER

CROSS REFERENCE TO RELATED APPLICATIONS

This application is a continuation of U.S. patent application Ser. No. 15/992,524, filed on May 30, 2018, which claims priority from prior Japanese Patent Application No. 2017-108841, filed on May 31, 2017, the entire contents of which are each incorporated herein by reference.

FIELD OF THE INVENTION

The present invention relates to a sample preparation apparatus, a sample preparation system, a sample preparation method, and a particle analyzer.

BACKGROUND

Japanese Patent Publication No. 07-301586 discloses a sample processing apparatus provided with concentration measuring means for measuring the concentration of particle components contained in a liquid sample, and a concentration unit for concentrating the sample by the filtering action of a filter. WIPO Patent Publication No. 2009/122999 discloses a sample preparation apparatus which generates concentration information reflecting the concentration of epithelial cells contained in a biological sample when detecting cancerous cells among the epithelial cells contained in the biological sample, and controls the amount of the biological sample to be supplied to a sample preparation unit based on the concentration information.

The sample processing apparatus described in Japanese Patent Publication No. 07-301586 discloses concentrating the cells in the sample for the purpose of improving the high reproducibility (probability error) of the measurement result when the particle concentration is low in a particle analyzer such as a flow cytometer. The sample preparation apparatus described in WIPO Patent Publication No. 2009/122999 discloses adjusting an amount of a biological sample which is mixed with a staining liquid based on the concentration of the epithelial cells in the biological sample obtained in a preliminary measurement so that the epithelial cells are appropriately stained with the staining liquid.

SUMMARY OF THE INVENTION

The sample processing apparatus described in Japanese Patent Publication No. 07-301586 and the sample preparation apparatus described in WIPO Patent Publication No. 2009/122999 both stain cell nuclei by simple staining using pigments such as ethidium bromide, acridine orange, propidium iodide and the like, and detect the stained cells by an optical detection method.

On the other hand, in current flow cytometric examinations, the type of antigen measured by one examination request ranges from 10 to 30 types per sample in order to diagnose one disease. For this reason, multi-color flow cytometry, in which several to ten kinds of antigens are simultaneously measured in a single analysis, is the main flow cytometry employed in flow cytometry. In order to detect all antigens that have been requested to be examined, multicolor flow cytometric analysis using several kinds of antibodies per analysis also needs to be performed multiple times for each sample. The abundance of each antigen present in one cell also differs from antigen to antigen. In order to accurately detect a target antigen, it is necessary to use a fluorescently labeled antibody in an amount appropriate for each antigen. Since stem cells such as hematopoietic stem cells have low abundance ratios themselves in the living body, the amount of sample itself to be analyzed has to be increased in order to reliably detect stem cells.

At present, the determination of the mixing ratio of a sample and detection reagent and the determination of the necessary amount of sample are carried out by the examiner in some form by obtaining information on the concentration of particles in the sample. All preparations of measurement samples based on the determined contents are also performed by the examiner. From this situation, accurate flow cytometry testing currently requires enormous labor.

The present invention efficiently prepares a measurement sample and analyzes measurement target particles in the sample with high accuracy.

A first aspect of the invention relates to a sample preparation apparatus 1. The sample preparation apparatus 1 includes a measurement unit 2 configured to measure a sample containing particles acquired from a sample container 10 and detect measurement target particles in the sample, a sample preparation unit 3 capable of adjusting the concentration of measurement target particles in a sample acquired from a sample container 10 and configured to prepare a measurement sample by mixing a sample and any of a plurality of types of particle detection reagents including a particle labeling substance, and a control unit 4 for controlling the sample preparation unit 3 so as to generate concentration information of the measurement target particles in the sample in the sample container 10 based on the measurement data of the measurement unit 2 and adjust the concentration of the measurement target particles in the sample acquired from the sample container 10 according to the generated concentration information and the type of particle detection reagent used for preparing the measurement sample.

A second aspect of the invention relates to a sample preparation apparatus 1. The sample preparation apparatus 1 includes a measurement unit 2 configured to measure a sample containing particles acquired from a sample container 10 and detect measurement target particles in the sample, a sample preparation unit 3 configured to prepare a measurement sample by mixing a sample acquired from the sample container 10 and any of a plurality of types of particle detection reagents including a particle labeling substance, and a control unit 4 for controlling the sample preparation unit 3 so as to acquire the number of measurement target particles in the sample in the sample container 10 based on the measurement data of the measurement unit 2 and prepare a number of measurement samples based on the acquired number of measurement target particles and the type of particle detection reagent.

A third aspect of the invention relates to a sample preparation method. The sample preparation method according to this aspect automatically executes a step of generating concentration information of a measurement target particle in a sample, a step of acquiring type information of a particle detection reagent used for preparing a measurement sample, a step of automatically adjusting the concentration of the measurement target particles in the sample used for preparation of the measurement sample according to the acquired type information and generated concentration information, and a step of preparing a measurement sample by mixing a particle detection reagent with the sample in which the concentration of measurement target particles has been adjusted.

A fourth aspect of the invention relates to a sample preparation method. The sample preparation method according to this aspect automatically executes a step of measuring the number of measurement target particles contained in a sample in a sample container, a step of determining the number of measurement sample to be prepared according to the type of particle detection reagent and the measured number of measurement target particles, and a step of preparing a measurement sample by mixing the sample with the particle detection reagent based on the determined number.

A fifth aspect of the invention relates to a sample preparation system 1'. The sample preparation system 1' according to this aspect includes a measurement device 2 for measuring a sample containing particles acquired from a sample container 10 and detecting measurement target particles in the sample, a sample preparation apparatus 3' capable of adjusting the concentration of the measurement target particles in the sample acquired from the sample container 10 which prepares a measurement sample by mixing the sample with any one of a plurality of kinds of particle detection reagents including a particle labeling substance, and a control device 4' that is connected to the measurement device 2' and the sample preparation device 3' and is configured to control the sample preparation apparatus 3' so as to generate concentration information of the measurement target particles in the sample in the sample container 10 based on the measurement data of the measuring device 2', and adjust the concentration of measurement target particles in the sample acquired from the sample container 10 according to the type of particle detection reagent used in the preparation of the measurement sample and the generated concentration information.

A sixth aspect of the invention relates to a particle analyzer 100. The particle analyzer 100 according to this aspect includes a first measurement unit 2 that measures a sample including particles acquired from the sample container 10 and detects measurement target particles in the sample, a sample preparation unit 3 capable of adjusting the concentration of measurement target particles in a sample acquired from a sample container 10 and which prepares a measurement sample by mixing the sample and any one of a plurality of types of particle detection reagents including a particle labeling substance, a control device configured to control the sample preparation unit 3 so as to generate concentration information of the measurement target particles in the sample in the sample container 10 based on the measurement data of the first measurement unit 2 and adjust the concentration of the measurement target particles in the sample acquired from the sample container 10 according to the generated concentration information and the type of particle detection reagent to be used in the preparation of the measurement sample, a second measurement unit 2 configured to measure the measurement sample prepared by the sample preparation unit 3 and detect the measurement target particles in the measurement sample, and an analysis unit 5 for analyzing the measurement target particles based on the measurement data of the second measurement unit 2. Note that the first measurement unit and the second measurement unit may be integratedly configured by the same device or may be configured separately with different devices.

According to the first to sixth aspects of the invention, after a measurement is performed to detect measurement target particles in a sample and concentration information of the measurement target particles in the sample is generated based on the measurement data, the concentration of the measurement target particles in the sample to be supplied to the sample preparing unit is adjusted according to the concentration information and the particle detecting reagent used for preparation of the measurement sample, and the specimen preparation unit then prepares the measurement sample. Therefore, it is possible to efficiently prepare a measurement sample including the measurement target particles at a concentration suitable for the particle detection reagent, and it is possible to analyze the measurement target particle in the sample with high accuracy.

According to the invention, it is possible to improve the efficiency of preparing a measurement sample performed based on the particle detection reagent and the concentration information of the measurement target particles contained in the sample, and to accurately analyze the measurement target particles in the sample.

BRIEF DESCRIPTION OF THE DRAWINGS

FIG. 13A is an example of information concerning preparation of a measurement sample when preparing a measurement sample by dispensing all of a plurality of cell detection reagents into one dispensing tube;

FIG. 13B is an example of information relating to preparation of a measurement sample when preparing a measurement sample by dispensing a plurality of cell detection reagents into different dispensing tubes, respectively;

FIG. 15 is a diagram showing an example of a method for preparing measurement samples for samples A to C.

DETAILED DESCRIPTION OF THE PREFERRED EMBODIMENTS

Figure 1:
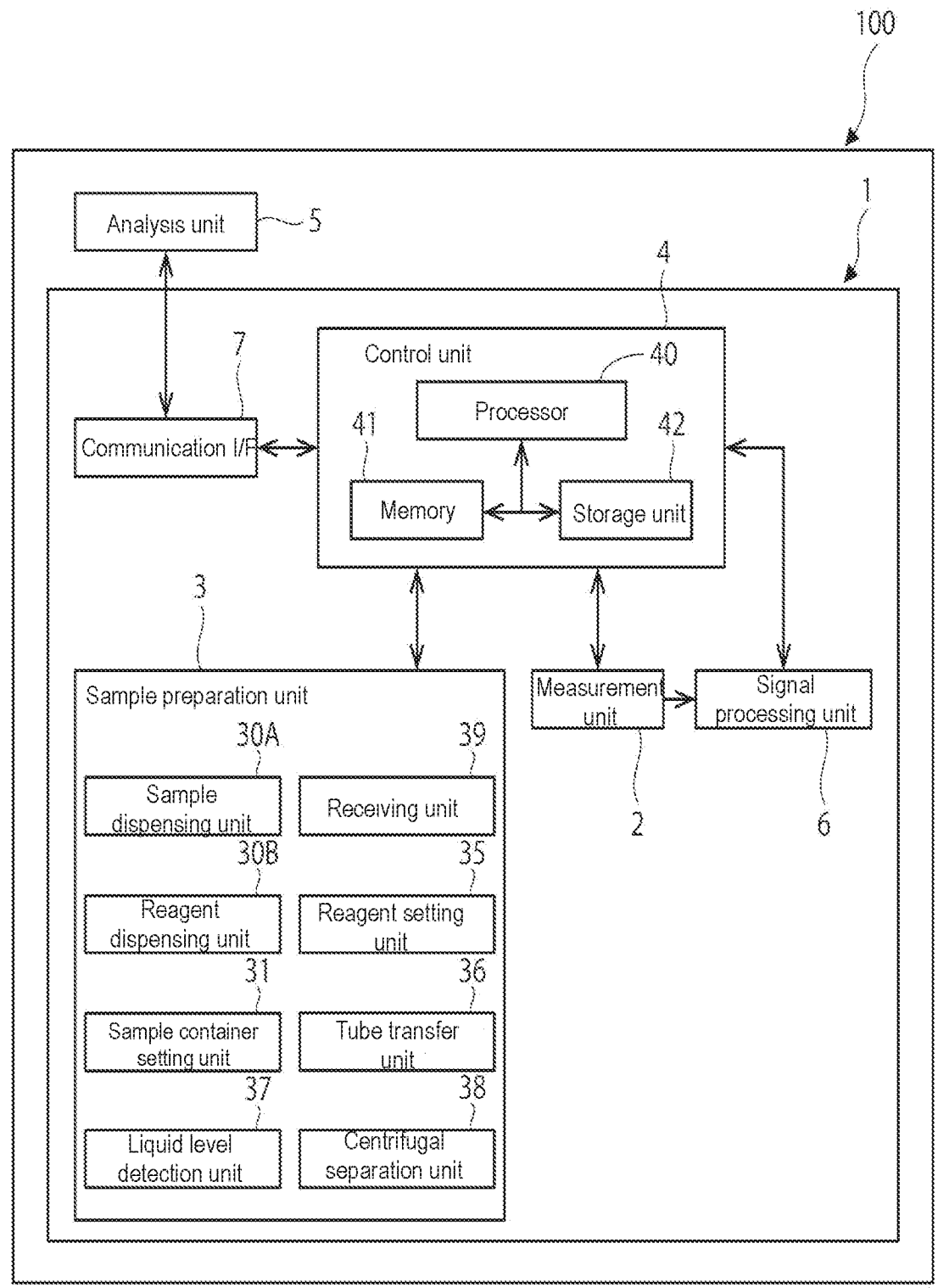
FIG. 1 is a block diagram of a sample preparation apparatus.

Hereinafter, embodiments of the invention will be described in detail with reference to the accompanying drawings. The sample preparation apparatus prepares a measurement sample suitable for analysis of a sample that includes particles. The particle analyzer also prepares a measurement sample suitable for analysis of a sample that includes particles, and optically analyzes the prepared measurement sample, whereby the number or type of particles contained in the sample is identified, or both. Specifically, for example, a sample preparation apparatus and a particle analyzer are used to detect hematopoietic stem cells contained in umbilical cord blood or bone marrow. The sample preparation apparatus and the particle analyzer are used for determining whether a sample contains abnormal cells such as hematopoietic tumor cells such as leukemia cells, and cancer cells such as lung cancer cells.

The measurement target particles may be, for example, artificial particles such as metal particles or plastic particles. The particle also may be a biological component other than cells such as a cylinder, and may be a cell such as a microorganism, an animal cell, a plant cell or the like. The sample containing particles is not limited insofar as it is a liquid containing particles (which may be a stock solution or a dilute solution). Preferably, the particle is, for example, a cell culture sample or a biological sample. A cell culture sample is, for example, a sample containing cells cultured in vitro. Examples of biological samples are peripheral blood, umbilical cord blood, bone marrow, cerebrospinal fluid, ascites, pleural effusion, interstitial fluid, urine and the like. Preferable examples of biological samples are peripheral blood, umbilical cord blood or bone marrow.

The particle detection reagent contains at least one particle labeling substance per reagent. The particle labeling substance is not limited insofar as particles can be detected. The particle detection reagent is preferably a cell detection reagent. The particle labeling substance also is preferably a cell labeling substance. The particle detection reagent preferably contains at least one cell labeling substance selected from a group including one or more nucleic acid labeling substances that label nucleic acids and one or more protein labeling substances that label proteins. Preferred examples of the nucleic acid labeling substance are ethidium bromide (EB), acridine orange (AO), propidium iodide (PI), 7-amino-actinomycin D (7-AAD), 4',6-diamidino-indole (DAPI), Hoechst 33342 (2'-(4-ethoxyphenyl)-5-(4-methyl-1-piperazinyl)-2,5'-bi-1H-benzimidazole trihydrochloride), ethidium homodimer-1, ethidium homodimer 2, ethidium monoazide, trimethylenebis[[3-[[4-[[(3-methylbenzothiazol-3-ium)-2-yl] methylene]-1,4-dihydroquinoline]-1-yl] propyl]dimethylaminium]-tetraiodide (TOTO-1), 4-[(3-(TO-PRO-1), N,N,N',N'-tetramethyl-N, N'-bis [3-[4-[3-[(3-methylbenzothiazol-3-ium)-2-yl]-2-propenylidene]-1, 4-dihydroquinolin-]-1,3-propanediaminium tetraiodide (TOTO-3) or 2-[3-[[1-[3-(trimethylamino) propyl]-1,4-dihydroquinolin]-4-ylidene]-1-propenyl]-3-methylbenzothiazol-3-ium-diiodide (TO-PRO-3), or fluorescent dyes represented by the following structural formula (IV).

In the formula, $R_1$ and $R_4$ are alkyl groups having a hydrogen atom, an alkyl group, a hydroxy group, an alkyl group having an ether group, an alkyl group having an ester group, or a benzyl group which may have a substituent; R2 and R3 are hydrogen atoms, a hydroxyl group, a halogen, an alkyl group, an alkenyl group, an alkynyl group, or an alkoxy group; Z is a sulfur atom, an oxygen atom, or a carbon atom having a methyl group; n is 0 or 3; $X^-$ is an anion.

In the structural formula (IV), one or another of the $R_1$ and $R_4$ is an alkyl group having 6 to 18 carbon atoms, and the other is preferably a hydrogen atom or an alkyl group having less than 6 carbon atoms. The alkyl group having 6 to 18 carbon atoms is preferably an alkyl group having 6, 8 or 10 carbon atoms. As the substituent of the benzyl group of $R_1$ and $R_4$, an alkyl group having 1 to 20 carbon atoms, an alkenyl group having 2 to 20 carbon atoms, or an alkynyl group having 2 to 20 carbon atoms can be mentioned, and a methyl group or an ethyl group is preferable. $R_2$ and $R_3$ include an alkenyl group having 2 to 20 carbon atoms. $R_2$ and $R_3$ include an alkoxy group having 1 to 20 carbon atoms, and preferably a methoxy group or an ethoxy group in particular. As the anion of $X^-$, a halogen ion such as $F^-$, $Cl^-$, $Br^-$, $I^-$ or $CF_3$, $CF_3SO_3^-$, $BF_4^-$ and the like may be considered.

Examples of a nucleic acid labeling substance include a fluorescently labeled nucleic acid probe and a fluorescently labeled nucleotide. Examples of a protein labeling substance include a fluorescent substance is labeled, and a protein capable of binding to a target protein or a vitamin capable of binding to an objective protein. Examples of a protein binding to a target protein include a ligand, an antibody, a lectin or a lipid binding protein (preferably a phospholipid-binding protein) which binds to a receptor. The fluorescent substance is not limited insofar as it can be detected by the measurement unit 2. The fluorescent substance is preferably a substance that can be used for flow cytometry.

The particle detection reagent set in the reagent setting unit 35 of the reagent preparation apparatus 1 to be described later preferably corresponds to a plurality of particle labeling substances. "Corresponding to a particle labeling substance" may refer to a case in which a plurality of particle labeling substances are contained in one particle detection reagent, or a case in which a plurality of particle detection reagents contain one or more particle labeling substances.

It is preferable that each particle detection reagent or each particle labeling substance is mixed with particles contained in the sample at an appropriate mixing ratio. The ratio also may be different for each particle detection reagent or each particle labeling substance. For example, when a plurality of types of particles are contained in one sample, the mixing ratio is determined in consideration of the proportion of measurement target particles.

In the following embodiments, the measurement target particles are described as cells, but the sample preparation apparatus and the particle analyzer are not limited only to analysis of cells.

Sample Preparation Apparatus and Particle Analyzer Structures

FIG. 1 shows a schematic configuration of the particle analyzer 100 of the embodiment. The particle analyzer 100 of the embodiment includes a sample preparation apparatus 1 and an analysis unit 5. The sample preparation apparatus 1 according to the embodiment includes a measurement unit 2 that performs preliminary measurement of a sample and a main measurement of a measurement sample, a sample preparation unit 3 that adjusts the concentration of a sample

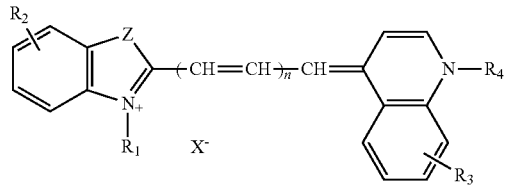

and prepares a measurement sample, and a control unit 4 for controlling the measurement unit 2 and the sample preparation unit 3. The analysis unit 5 analyzes the measurement data obtained by the main measurement of the measurement unit 2 and the like.

Measurement Unit Structure

The measurement unit 2 functions as a pre-measurement unit that pre-measures the sample and detects the number of measurement target cells contained in the sample. The measurement unit 2 of the embodiment also functions as a main measurement unit that performs a main measurement of the measurement sample and detects information on the characteristics of the measurement target cells for cell analysis by the analysis unit 5. A flow cytometer is employed as the measurement unit 2 of the embodiment.

Figure 2:
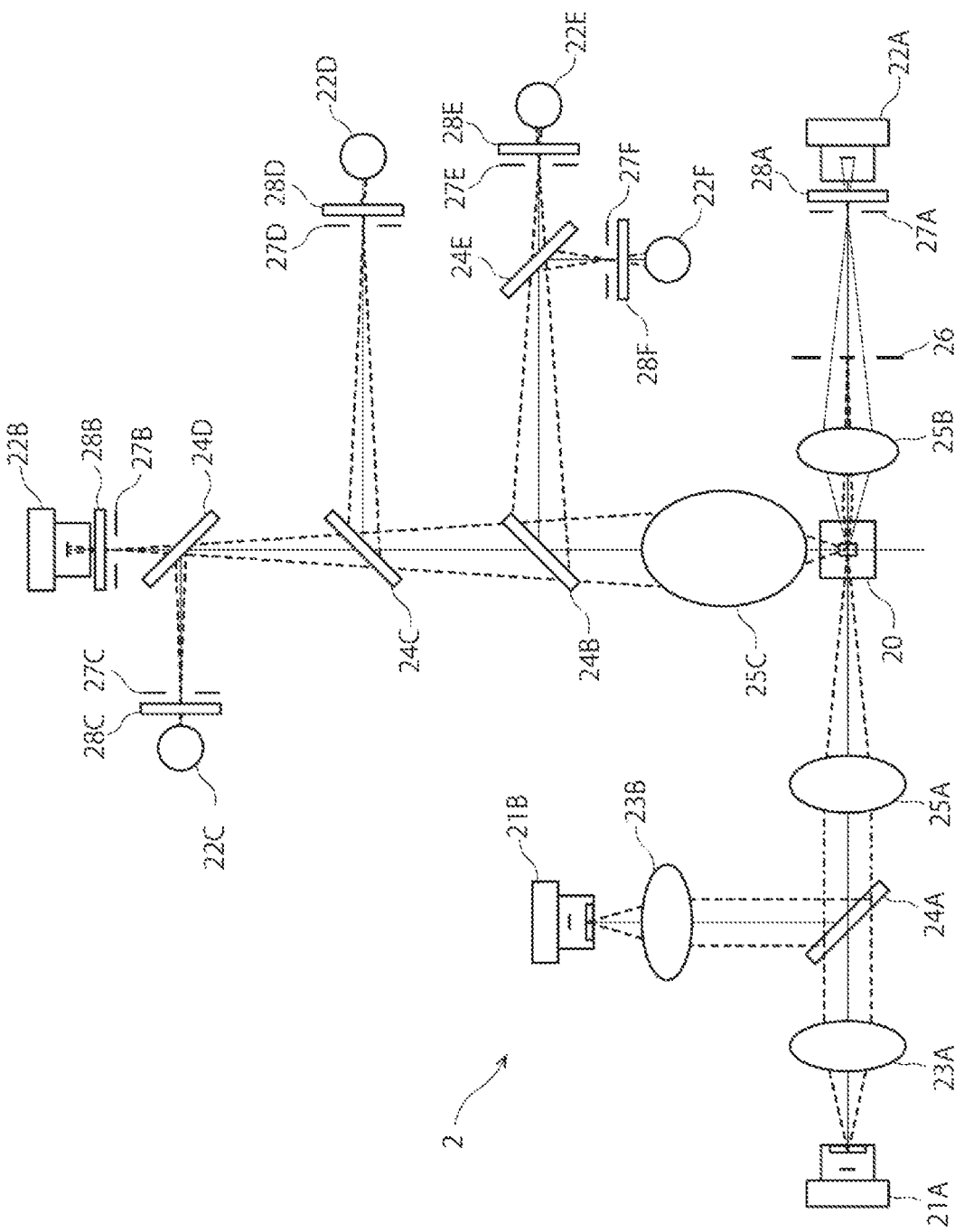
FIG. 2 is a brief diagram showing an optical system of a flow cytometer.
Figure 3:
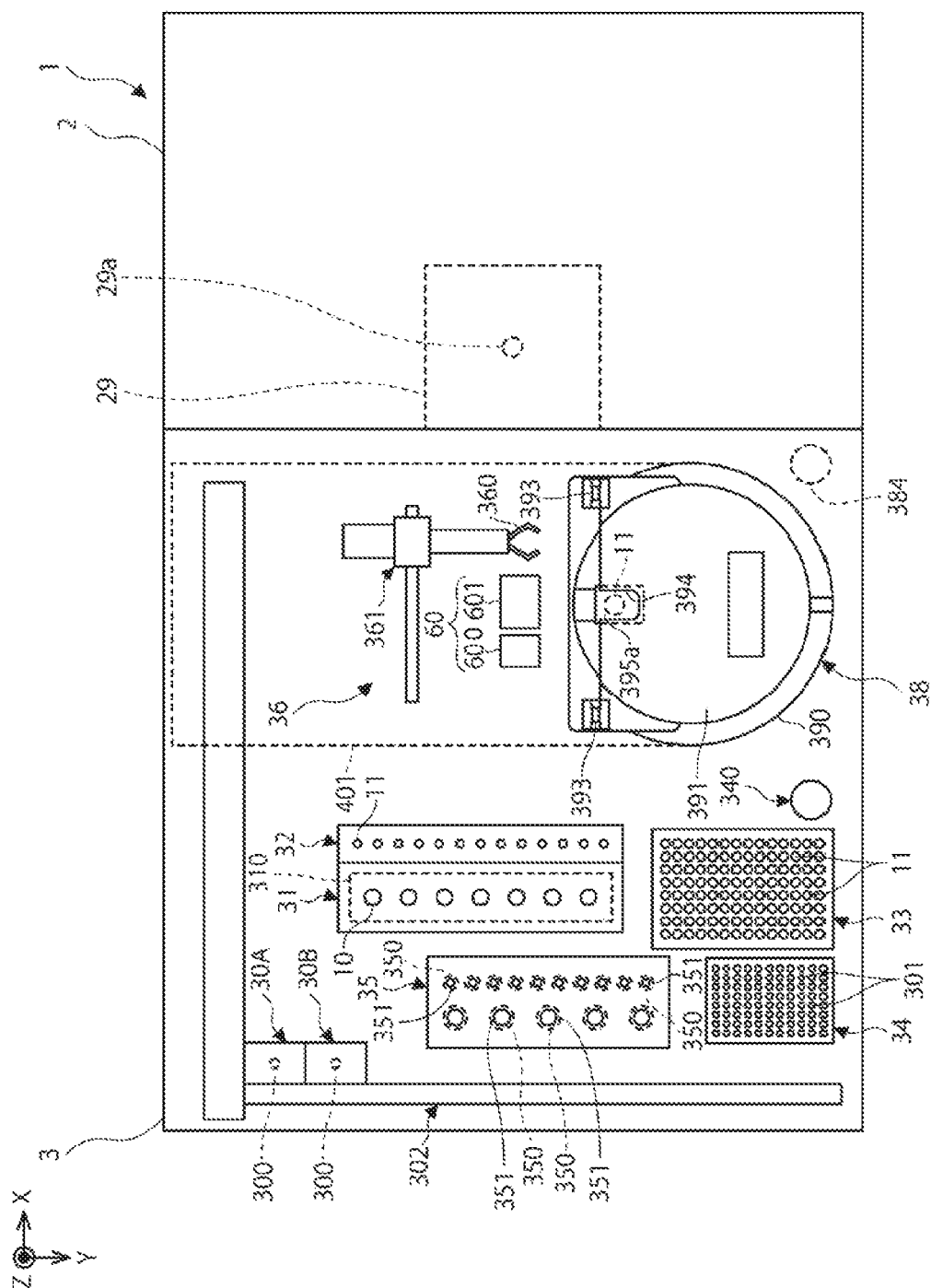
FIG. 3 is a schematic configuration diagram of a reagent preparation device.

FIG. 2 is a schematic diagram showing the optical system of the flow cytometer configuring the measurement unit 2. The flow cytometer includes a flow cell 20 through which a sample passes, light sources 21A and 21B for irradiating light on the sample passing through the flow cell 20, and a light receiving element 22A to 22F for detecting optical information of the light given off from the particles in the sample and converting the optical information into electric signals that are output as detection signals.

The optical information is information included in one or two or more light wavelength spectra emitted from particles. The light wavelength spectra includes individual light wavelengths, light wavelength regions included in the light wavelength spectrum, light intensities of the respective light wavelengths, and light intensities in the light wavelength region.

The light emitted from the light source 21A irradiates the flow cell 20 via the collimator lens 23A, the dichroic mirror 24A, and the condenser lens 25A. The forward scattered light of the light derived from the particles passing through the flow cell 20 is condensed by the condenser lens 25B and enters the light receiving element 22A via the beam stopper 26, the pin hole plate 27A, and the band pass filter 28A.

On the other hand, side scattered light and lateral fluorescent light given off from the particles passing through the flow cell 20 are collected by the condenser lens 25C. The side scattered light enters the light receiving element 22B through the dichroic mirrors 24B to 24D, the pin hole plate 27B and the band pass filter 28B. The side fluorescent light having a wavelength of 520 nm or more and 542 nm or less passes through the dichroic mirrors 24B and 24C, then is reflected by the dichroic mirror 24 D, and enters the light receiving element 22C via the pinhole plate 27C and the bandpass filter 28C. The side fluorescent light having a wavelength of 570 nm or more and 620 nm or less passes through the dichroic mirror 24B and is reflected by the dichroic mirror 24C, and passes through the pinhole plate 27D and bandpass filter 28D and impinges on the light receiving element 22D. Side fluorescent light having a wavelength of 670 nm or more and 800 nm or less is reflected by the dichroic mirror 24B, passes through the dichroic mirror 24E, and enters the light receiving element 22E via the pinhole plate 27E and the bandpass filter 28E.

The light emitted from the light source 21B is irradiated on the flow cell 20 via the collimating lens 23B, the dichroic mirror 24A, and the condensing lens 25A. The side fluorescent light of the light given off from the particles passing through the flow cell 20 is collected by the condenser lens 25C. The side fluorescent light of 662.5 nm or more and 687.5 nm or less is reflected by the dichroic mirror 24B, reflected by the dichroic mirror 24E, and then enters the light receiving element 22F via the pinhole plate 27F and the bandpass filter 28F.

For example, a laser diode with a wavelength of 488 nm is used for the light source 21A, and a laser diode with a wavelength of 642 nm is used for the light source 21B. A sheath flow cell is used for the flow cell 20. A photodiode is used for the light receiving element 22A that receives the forward scattered light, an avalanche photodiode (APD) is used for the light receiving element 22B that receives the side scattered light, and a photomultiplier tube (Photo Multiplier Tube, PMT) is used for the light receiving elements 22C to 22F that receive the side fluorescent light. In FIG. 2, note that although the flow cytometer has six light receiving elements 22A to 22F and the four light receiving elements 22C to 22F detect optical information of four lights having different peak wavelengths derived from a dye bonded to particles in a sample, the invention is not limited to this arrangement inasmuch as it is also possible to provide three or more light receiving elements wherein at least two or more of the three or more light receiving elements detect optical information of light derived from at least two dyes having different peak wavelengths.

The number of light sources may be one, or two or more. For example, the number of light sources can be selected between integers from 1 to 10. The light source is selected according to the wavelength region of light derived from the dye bound to the particle. When the light sources are 2 or more, it is preferable that these light sources emit light having different peak wavelengths. two or more light sources are preferable because it is possible to separate and detect fluorescence with high accuracy as compared to when there is only one light source. On the other hand, when two light sources are used, it is possible to separate and detect a plurality of fluorescence by shifting the light emission timing from each light source. By using a dye suitable for the peak wavelength of light from each light source, it is also possible to reduce the overlapping portion of the respective wavelength regions of the plurality of fluorescences by shifting the light emission timing from each light source. The light source is not limited insofar as light in the wavelength region for detection is emitted from the particle. For example, one or more light sources selected from a group including a halogen lamp, an LED (Light Emitting Diode) lamp, a gas laser, and a laser diode (semiconductor laser) can be used as a light source. The number of photodiodes, dichroic mirrors, and bandpass filters can be varied according to the number of peak wavelengths of light originating from the particles. The types of the photodiode, the dichroic mirror, and the bandpass filter can also be selected according to the peak wavelength of light derived from the particle, the wavelength region, and the intensity thereof.

Detection signals output from the light receiving elements 22A to 22F are amplified by a preamplifier (not shown) and sent to the signal processing unit 6 (shown in FIG. 1). The signal processing unit 6 includes a signal processing circuit that performs signal processing necessary for the detection signal output from the measurement unit 2.

Sample Preparation Unit Structure

As shown in FIGS. 1 and 3 to 7, the sample preparation unit 3 adjusts the concentration of the measurement target cells in the sample used to prepare the measurement sample, the prepares a measurement sample from the sample and one or more cell detection reagents selected a plurality of cell detection reagents. Note that the configuration of the sample preparation unit 3 shown below is merely an example, and the sample preparation unit 3 is not limited to the following configuration.

The sample preparation unit 3 includes a sample dispensing unit 30A, a reagent dispensing unit 30B, a sample container setting unit 31, a dispensing tube setting unit 32, a dispensing tube storing unit 33, a pipette tip storing unit 34, a reagent setting unit 35, a tube transfer unit 36, a liquid amount detection unit 37, a centrifugal separation unit 38, and a receiving unit 39. Note that in FIGS. 3 to 6 the XYZ axes are orthogonal to one another, and the X axis indicates the horizontal direction, the Y axis indicates the front and rear direction, and the Z axis indicates the vertical direction.

Each of the sample dispensing units 30A and the reagent dispensing unit 30B has a nozzle 300. For example, a disposable plastic pipette tip 301 is mounted on the nozzle 300. Note that it is not always necessary to use the pipette tip 301. The sample dispensing unit 30A suctions and discharges a predetermined amount of sample from the sample container 10 of the sample container setting unit 31 by suctioning and ejecting the sample through the pipette tip 301 of the nozzle 300, and discharges the sample to the dispensing tube 11. The nozzle 300 suctions and discharges the liquid through the pipette tip 301, so that the reagent dispensing unit 30B suctions a predetermined amount of the reagent from the reagent container 350 of the reagent setting unit 35 and supplies the reagent to the dispensing tube 11. The amount (volume) of the sample or reagent suctioned by the nozzle 300 can be acquired from a flow rate sensor (not shown) provided in each dispensing unit 30A, 30B. Each of the dispensing units 30A and 30B includes a nozzle transfer unit 302 that moves the nozzle 300 in the X, Y, and Z axis directions. The nozzle transfer unit 302 moves the nozzle 300 by driving a motor (not shown).

In the sample dispensing unit 30 of the embodiment, the nozzle 300 is provided with a liquid surface detection sensor (not shown) for detecting the liquid level of the sample in the sample container 10 when it is positioned directly above the sample container 10 as a liquid amount detection unit 37 for detecting the amount of the sample contained in the sample container 10. By detecting the liquid level of the sample in the sample container 10, it is possible to calculate the liquid amount (sample amount) of the sample contained in the sample container 10.

A sample container 10 containing a sample collected from a subject is set in the sample container setting unit 31. A plurality of sample containers 10 can be set in the sample container setting unit 31. In the dispensing tube setting unit 32, a dispensing tube 11 for accommodating a sample and a prepared sample used for measurement by the measurement unit 2 is set in the sample container setting unit 31. A plurality of dispensing tubes 11 can be set in the dispensing tube setting unit 32.

The sample container setting unit 31 includes a sample temperature adjusting unit 310 such as a warming device or a cooling device. The temperature of the sample accommodated in the sample container 10 can be set to a temperature suitable for the sample by the sample temperature adjusting unit 310. The cooling device is configured by, for example, a Peltier element, a compressor, or other cooling device. The heating device is configured by, for example, a block heater or other heater. The temperature inside the sample container setting unit 31 is measured by a temperature sensor (not shown).

A plurality of dispensing tubes 11 are stocked in the dispensing tube storage unit 33. The dispensing tube 11 of the dispensing tube storage unit 33 is transported to the dispensing tube setting unit 32 by the tube transfer unit 36 and set.

A plurality of pipette tips 301 to be attached to the nozzle 300 are stocked in the pipette tip storage unit 34. Pipette tips 301 of different sizes are stocked in the pipette tip storage section 34. A pipette tip 301 of either a large or small size can be attached to the nozzle 300, and a pipette tip 301 of a size corresponding to the dispensing amount of a sample or a reagent is attached to the nozzle 300. Note that a used pipette tip 301 is discarded in the discard unit 340.

The reagent setting unit 35 is a reagent storage having a plurality of reagents, and a plurality of reagent containers 350 containing reagents are set inside the reagent setting unit 35. A plurality of openings 351 are formed in the reagent setting unit 35, respectively, and a reagent container 350 is set below the opening 351. The reagent can be suctioned by allowing the nozzle 300 of the reagent dispensing unit 30B to enter the reagent container 350 from the opening 351.

A plurality of cell detection reagents are set in the reagent setting unit 35. It is preferable that at least one cell labeling substance contained in each cell detection reagent is different among the cell detection reagents. The combination of a plurality of cell detection reagents set in the reagent setting unit 35 at one time, for example, may be a combination covering a group of cell labeling substances capable of detecting a group of cell markers necessary for specifying the type of leukemia. The cell detection reagent also may contain a buffer solution in addition to the cell labeling substance. The buffer solution also may contain a salt such as sodium chloride. It is preferable that the salt is added so as to become isotonic within the cell when preparing the measurement sample. The cell detection reagent also may contain cell fixing components such as methanol, paraformaldehyde and the like. The cell detection reagent also may contain RNase or the like.

In addition to the cell detection reagent, other reagents necessary for the preparation of the measurement sample according to the analysis of the measurement target cells, such as, for example, a hemolytic agent, a washing solution, a cell membrane penetrating agent, a diluting liquid, a cell fixing component, RNase, also can be set in the reagent setting unit 35. Note that the diluting liquid contains at least a buffer solution and may optionally contain a salt such as sodium chloride. The salt may be added so as to be isotonic within the cell when preparing the measurement sample. The diluting liquid may contain a hemolytic agent that causes hemolysis of erythrocytes. It is preferable that the hemolytic agent does not dissolve nucleated cells such as white blood cells. The hemolytic agent is preferably an aqueous solution containing a surfactant, citrate buffer, HEPES, phosphate buffer or the like. The surfactant may be any of an anionic surfactant, a cationic surfactant, a bipolar surfactant, a nonionic surfactant, a natural surfactant, and the like. One hemolytic agent also may contain a plurality of kinds of surfactants. More preferably, a hemolytic agent containing a cationic surfactant and an organic acid and having a pH in the range of 4.5 to 11.0, a hemolytic agent including a nonionic surfactant and an organic acid and having a pH in the range of 4.5 to 11.0, and a hemolytic agent containing an anionic surfactant and a natural surfactant and having a pH in the range of 4.5 to 11.0 can be mentioned. The pH range is preferably pH 6.0 to 8.0. These hemolytic agents also may contain alcohols such as methanol, ethanol, phenoxyethanol and the like, fixative solutions such as formaldehyde, chelating agents, sodium azide and the like. More specific hemolytic agents include ammonium chloride hemolytic agents (pH 7.3, ammonium chloride 1.68 M, potassium hydrogen carbonate 100 mM, EDTA 2 K 0.82 mM), cell fixing hemolytic agent (pH 7, formaldehyde 3, 10%, methanol 3.5%, diethyleneglycol 30%, citric acid 100 mM), cell membrane permeable hemolytic agent (pH 7.3, phenoxyethanol 1% or less, saponin 1% or less, N-laurylsarcosine sodium salt 1% or less, sodium azide 1% or less can be mentioned. The cell membrane permeable hemolytic agent also can be used as a cell membrane penetrating agent when detecting intracellular proteins.

Each reagent container 350 set in the reagent setting unit 35 is provided with a barcode, tag, or the like storing information on each reagent. The information on the reagent includes identification information (ID) for specifying the reagent. The information on the reagent also may include the name of the measurement item or the like. The reagent setting unit 35 includes a receiving unit 39 (shown in FIG. 1) such as an RFID reader, barcode reader capable of reading barcodes and the like, such that the information relating to the cell detection reagents and reagents other than the cell detection reagent set in the reagent setting unit 35 can be acquired and by reading a barcode or the like attached to the reagent container 350.

Note that in order to keep the temperature of the reagent in each reagent container 350 at a desired temperature, the reagent setting unit 35 may be provided with an internal reagent temperature adjusting unit (not shown). The reagent temperature adjusting unit is a cooling device capable of cooling the reagent in the reagent container 350 and/or a heating device capable of heating the reagent in the reagent container 350. The temperature inside the reagent setting unit 35 can be measured by a temperature sensor (not shown).

The tube transfer unit 36 includes a gripper 360 that holds the dispensing tube 11, and a moving unit 361 that moves the gripper 360 in the X, Y, and Z axis directions. The moving unit 361 moves the gripper 360 by driving a motor (not shown). The dispensing tube 11 of the dispensing tube setting unit 32 is transported to the centrifugal separation unit 38 and the measurement unit 2 by being moved while being held by the gripping 360.

The centrifugal separation unit 38 performs a preparation process for preparing a measurement sample from the sample and a predetermined reagent. The centrifugal separator 38 also performs a concentration adjustment process to adjust the concentration of measurement target cells in the sample by centrifugal separation. That is, in the embodiment, the centrifugal separation unit 38 functions as a concentration adjustment unit.

The centrifugal separation unit 38 is provided in a housing section provided with a cylindrical bottom tank body 390, a lid body 391 covering the upper opening of the tank body 390, and a temperature adjustment tank 392 provided at the lower part of the tank body 390. The lid 391 is attached to the tank body 390 via a hinge 393. The lid body 391 is formed with a first entry port 394 for entering into the tank body 390 from above. The first entry port 394 allows the nozzle 300 of each dispensing section 30A and 30B to enter into the tank body 390, and the nozzle 300 enters the tank body 390 through the first entry port 394 to discharge the sample or reagent into the dispensing tube 11 held in the centrifugal separation unit 38 or to suction the liquid in the dispensing tube 11.

Figure 5:
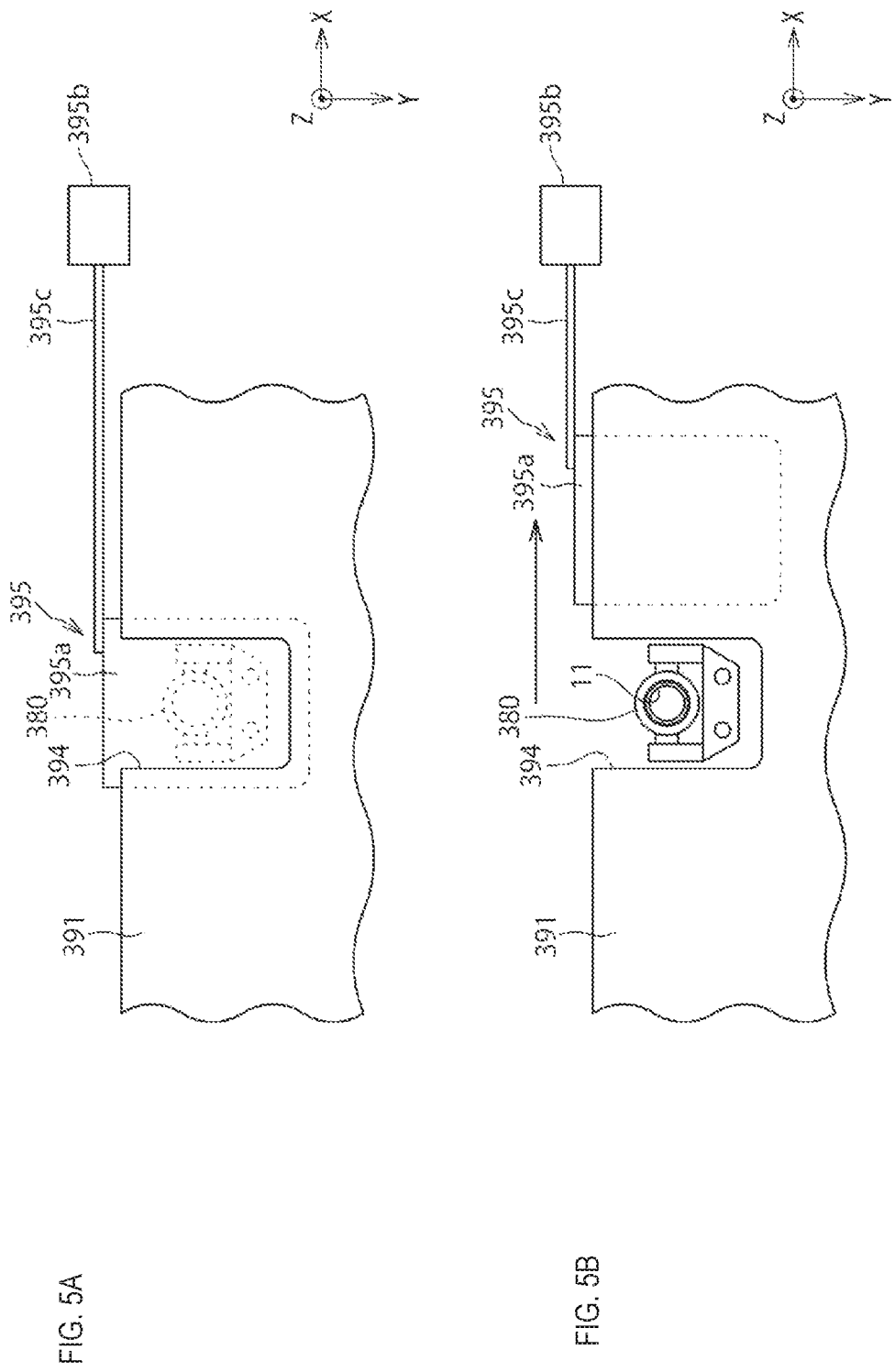
FIGS. 5A and 5B are partially enlarged views of a sample preparation unit.
Figure 6:
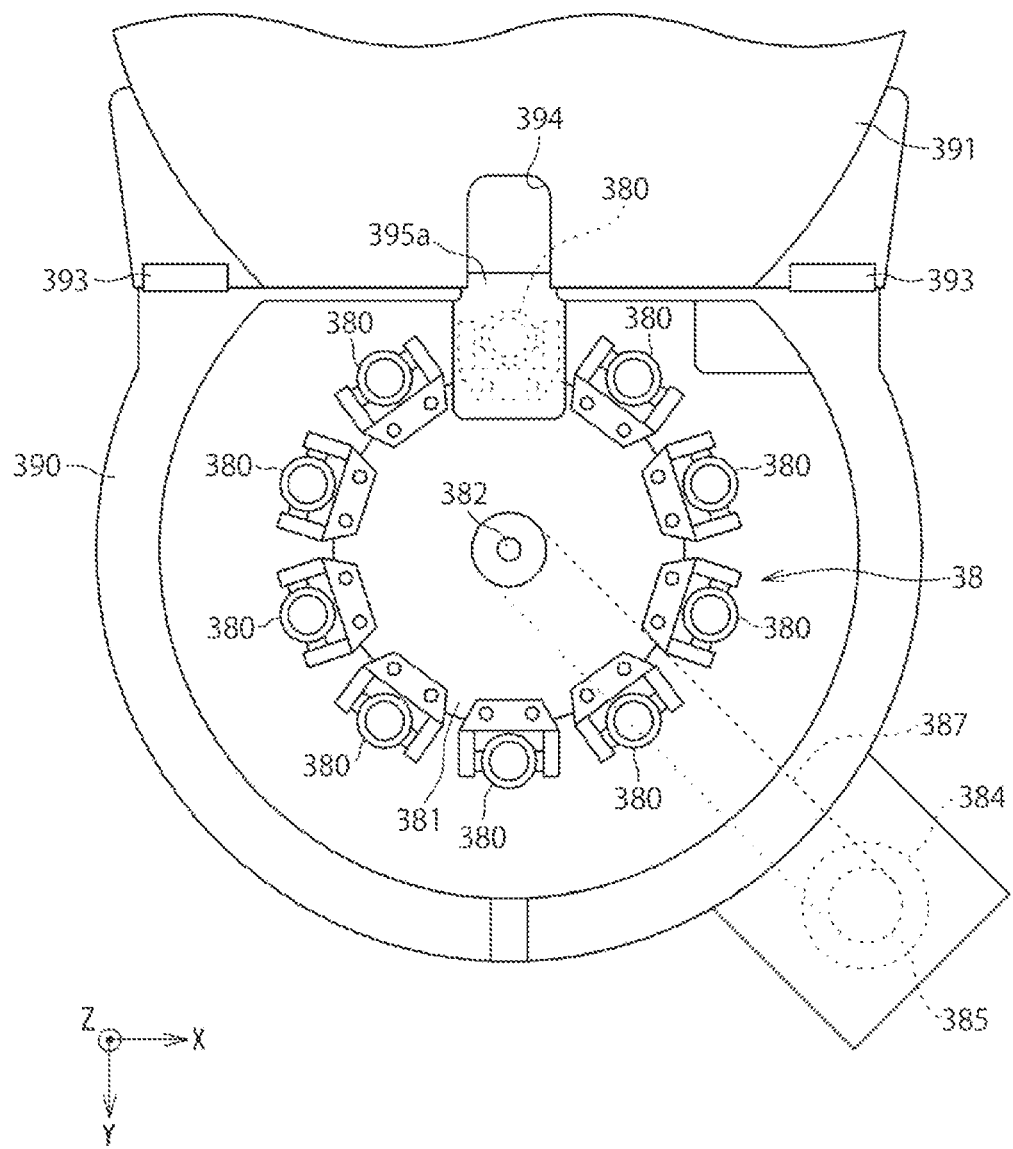
FIG. 6 is a plan view of a centrifugal separation unit.
Figure 7:
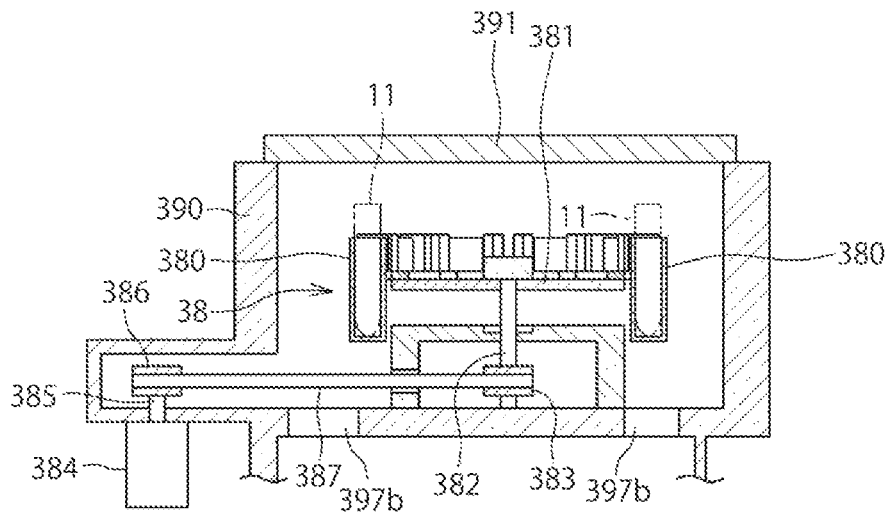
FIG. 7 is a partial cross-sectional view of a sample preparation unit.

The tank body 390 is provided with opening/closing device 395 for opening and closing the first entry port 394. The opening/closing device 395 of the embodiment is composed of a shutter 395a for closing the first entry port 394, a drive unit 395b for opening and closing the shutter 395a, and a connection unit 395c for connecting the shutter 395a and the drive unit 395b. The driving unit 395b is, for example, a solenoid, and moves the shutter 395a in the Y-axis direction. As shown in FIG. 5 (a), when the first entry port 394 is closed by the shutter 395a, the inside of the tank body 390 is substantially sealed, and temperature change in the tank body 390 can be suppressed. As shown in FIG. 5 (b), when the shutter 395a moves and the first entry port 394 is opened, the nozzle 300 also can be advanced into the tank body 390 from the first entry port 394.

Figure 4:
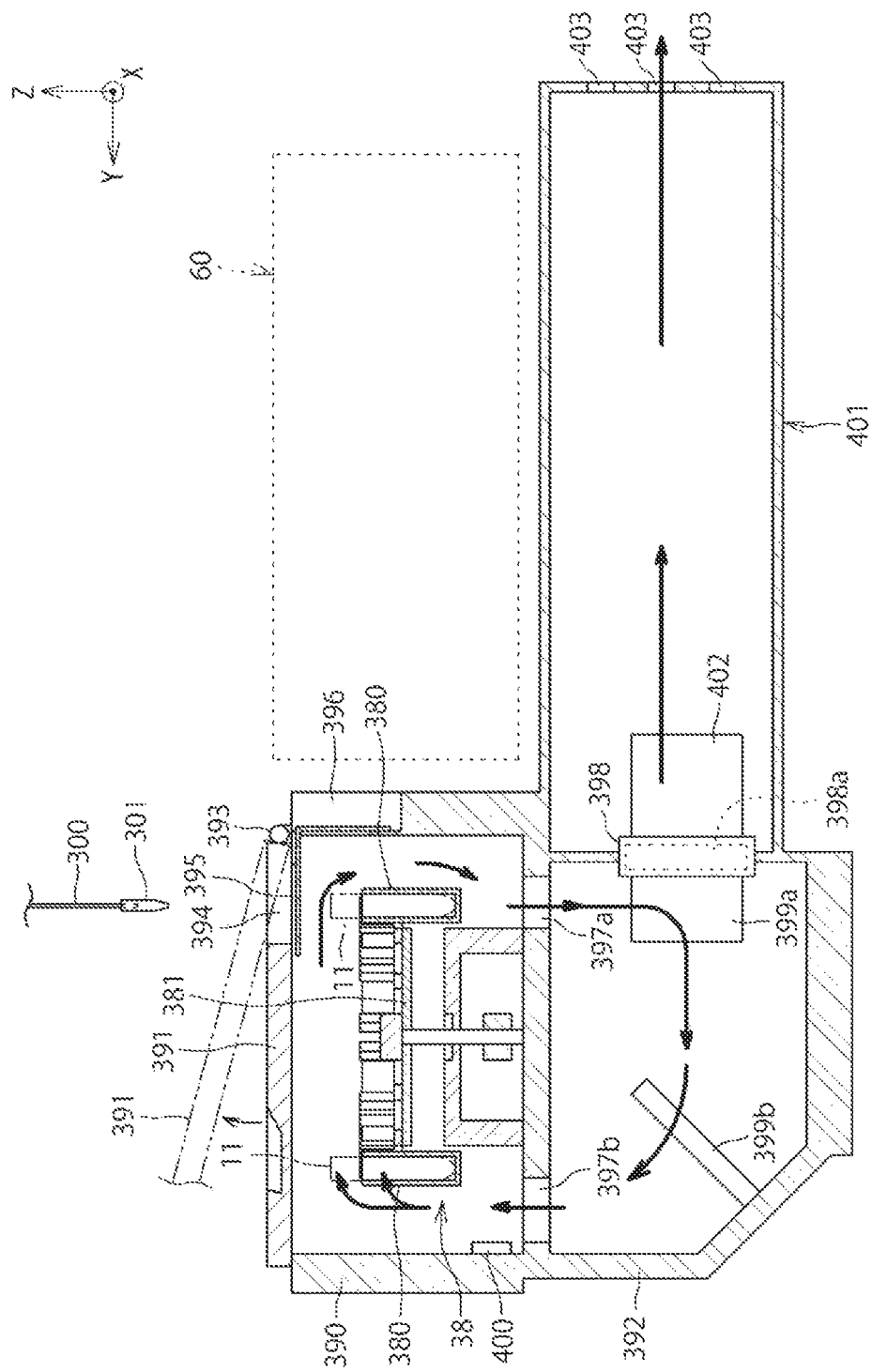
FIG. 4 is a cross-sectional view of a sample preparation unit.

Note that, as shown in FIG. 4, the tank body 390 has a second entry port 396 for entering into the tank body 390 from behind. The second entry port 396 allows the gripper 360 of the tube transfer unit 36 to enter into the tank body 390, so that the gripper 360 enters the tank body 390 through the second entry port 396 to set the dispensing tube 11 in the holding part 380 of the centrifugal separation unit 38, and to remove the dispensing tube 11 from the holding part 380 of the centrifugal separation unit 38. The shutter 395a is formed in an L shape in cross section so that the second entry port 396 can be closed together with the first entry port 394.

The centrifugal separation unit 38 includes a plurality of holding parts 380 for holding the dispensing tube 11, and a rotor 381 on which a plurality of holding parts 380 are attached on the outer circumference. Centrifugal separation is performed on the liquid in the dispensing tube 11 held by each holding part 380 by the rotation of the rotor 381. The rotor 381 rotates around a rotation shaft 382 rotatably supported at the bottom of the tank body 390 as the center of rotation. A first pulley 383 is provided under the rotation shaft 382. A second pulley 386 is provided on a rotation shaft 385 of a motor 384 that rotationally drives the rotation shaft 382, and an endless belt 387 is wound between the first pulley 383 and the second pulley 386. The rotation of the motor 384 is transmitted to the rotation shaft 382 through the first pulley 383, the endless belt 387, and the second pulley 386 to rotate the rotor 381. The motor 384 is disposed outside the sample preparation unit 8.

A temperature adjustment tank 392 is partitioned by the tank body 390 and the bottom portion of the tank body 390. Through holes 397a and 397b are formed in the bottom of the tank body 390, and the tank body 390 and the temperature adjustment tank 392 communicate with each other through the through holes 397a and 397b.

A temperature adjustment device 398 for adjusting the atmospheric temperature inside the tank body 390 is provided in the temperature adjustment tank 392. The temperature adjusting device 398 has, for example, a Peltier element 398a. In the temperature adjustment tank 392, convection generating units 399a and 399b are provided to generate convection circulating through the tank body 390 and the temperature adjustment tank 392 via the through-holes 397a and 397b. The convection generating units 399a and 399b are configured by, for example, a fan or the like. The interior of the tank body 390 can be heated to maintain a temperature higher than room temperature, the interior of the tank body can be cooled to maintain a temperature lower than room temperature, and the interior of the tank body can be maintained at a constant temperature approximately equal to room temperature by moving cold or heat from the temperature adjustment tank 392 to the tank body 390 by the air flow generated by the convection generating units 399a and 399b. In the tank body 390, a temperature sensor 400 is provided to monitor the temperature inside the tank body 390. Note that the temperature sensor 400 also may be provided in the temperature adjustment tank 392.

In the embodiment, the convection generating units 399a and 399b positioned near the convection generating unit 399a moves the cold or heat emitted from the temperature adjustment device 398 to the through hole 397b located away from the temperature adjustment device 398 by moving the convection flowing from the through hole 397a located above the convection generating unit 399a in a horizontal direction inside the temperature adjustment tank 392. The convection generating unit 399b is located below the through hole 397b and changes the horizontal air flow generated by the convection generating unit 399a into an upward air flow directed toward the upper through hole 397b. In this way the cold or heat emitted from the temperature adjustment device 398 can be efficiently fed from the through hole 397b into the tank body 390.

In the embodiment, a duct 401 is provided behind the temperature adjustment tank 392. The duct 401 is for discharging cold exhaust heat or warm exhaust heat generated by the temperature adjustment device 398 to the outside of the sample preparation unit 8. The duct 401 includes a fan 402 for letting cold exhaust heat or warm exhaust heat to the rear and an exhaust port 403 for discharging the air current generated by the fan 402 to the outside of the duct 401. The duct 401 is arranged below an external processing unit 37.

Figure 8:
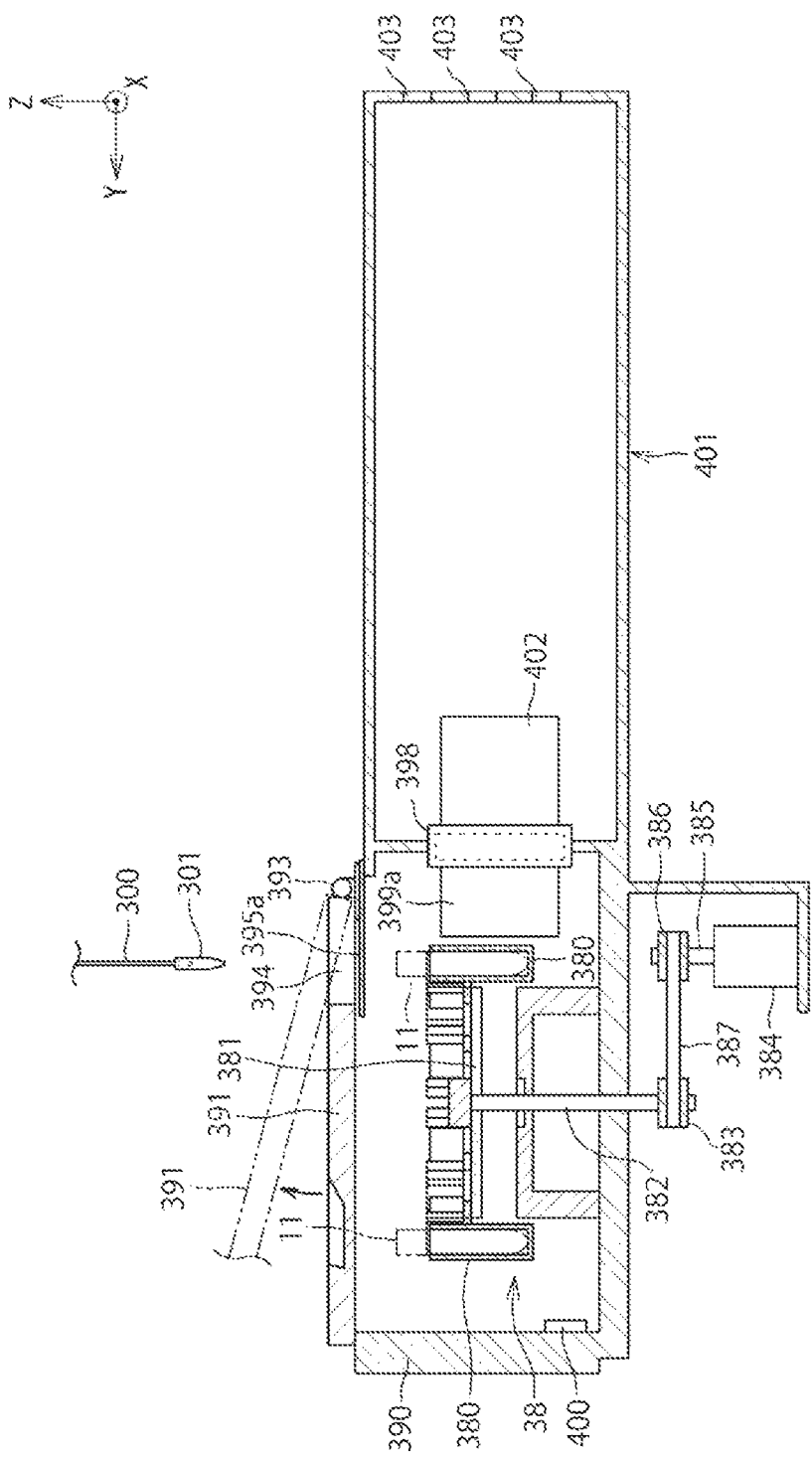
FIG. 8 is a cross-sectional view of a modification example of a sample preparation unit.

Note that the temperature adjustment tank 392 is not necessarily provided, as shown in FIG. 8. In this case, the temperature adjusting device 398 is provided inside the tank body 390, preferably on the rear side in the tank body 390, and the duct 401 is provided behind the tank body 390. The convection generating unit 399a is arranged in the vicinity of the temperature adjusting device 398 so as to generate a horizontal air current in the tank body 390.

The sample preparation unit 3 may be provided with an external processing unit 60 in addition to each unit described above. In the embodiment, the external processing unit 60 performs processing at room temperature without temperature adjustment, and is provided with a disposal unit 600 for discarding the supernatant in the dispensing tube 11, and a stirring unit 601 for stirring the liquid in the tube 11. The disposal unit 600 discards the supernatant in the dispensing tube 11 by decanting by tilting the dispensing tube 11 held by the gripper 360 via a moving device 361, or suctioning the supernatant through the nozzle 300 of the dispensing units 30A and 30B. The stirring unit 601 is configured by, for example, a vortex mixer that stirs and shakes the liquid in the dispensing tube 11 held by the gripper 360. Note that the external processing unit 60 may be configured to perform processing other than the disposal of the supernatant in the dispensing tube 11 and the stirring of the liquid in the dispensing tube 11 at room temperature.

Control Unit Structure

As shown in FIG. 1, the control unit 4 includes a processor 40, a memory 41 used for reading a control program recorded in the storage unit 42 and used for a work area for data processing of the processor 40, and a storage unit 42 for recording various control programs and various data for controlling the operation of each unit such as the measurement unit 2 and the sample preparation unit 3. The memory 41 is configured by a RAM (Random Access Memory). The storage unit 42 is configured by a ROM (read only memory), a hard disk, or the like.

For example, the control unit 4 acquires detection signals output from the light receiving elements 22A to 22F of the measurement unit 2 via the signal processing unit 6, and records them in the storage unit 42.

The control unit 4 also controls the operations of the sample dispensing unit 30A of the sample preparation unit 3, the nozzle 300 of the reagent dispensing unit 30B, and the nozzle transfer unit 302 to perform the movement of the nozzle 300 and the suction and discharge the liquid sample and reagent and the like.

The control unit 4 also controls the operation of the temperature adjustment unit 310 of the sample container setting unit 31 of the sample preparation unit 3 and the operation of the temperature adjustment unit (not shown) of the reagent setting unit 35 based on detection signals of a temperature sensor (not shown), and adjusts the temperatures of the sample container setting unit 31 and the reagent setting unit 35.

The control unit 4 also controls the operation of the tube transfer unit 36 of the sample preparation unit 3 to transfer and hold the dispensing tube 11.

The control unit 4 also controls the opening/closing unit 395 of the sample preparation unit 3 to open and close the entry ports 394 and 396.

The control unit 4 also controls the centrifugal separation unit 38 of the sample preparation unit 3 and performs centrifugal separation processing.

The control unit 4 also controls the temperature adjustment unit 398 and the convection generation units 399a and 399b of the sample preparation unit 3 based on the detection signal of the temperature sensor 400 to adjust the temperature of the centrifugal separation unit 38.

The control unit 4 also controls the operation of the fan 402 of the sample preparation unit 3 to exhaust the cold/warm heat of the centrifugal separation unit 38.

The control unit 4 also acquires a detection signal from the liquid level detection sensor as the liquid amount detection unit 37 of the sample preparation unit 3, and records the data in the storage unit 42.

The control unit 4 also acquires identification information (ID) of each reagent (a cell detection reagent and a reagent other than the cell detection reagent) read by the receiving unit 39 of the reagent setting unit 35 of the sample preparation unit 3. Then, on the basis of the read identification information (ID) of each reagent, data indicating which reagent is set at which position of the reagent setting unit 35 is recorded in the storage unit 42. Further, information can be read related to the preparation of a measurement sample corresponding to each test item to be tested using each cell detection reagent corresponding to the identification information (ID) recorded in the storage unit 42 based on the identification information (ID) of each cell detection reagent that has been read, and the sample preparation unit 3 can be controlled based on the information related to the preparation of the measurement sample to perform the concentration adjustment process of the measurement target particle in the sample and the preparation process of the measurement sample. Note that information related to the preparation of the measurement sample is determined independently by the user according to the measurement sample and recorded together with the type of the cell detection reagent and the like in a file referred to as a work list.

The manner of preparing the measurement sample differs depending on measurement items (for example, analysis of DNA amount, kind of antigen and the like), since it is necessary to prepare a measurement sample suitable for the cell analysis for each measurement item. The information on the preparation of the measurement sample includes information on the preparation of the measurement sample according to the measurement item of the measurement target cells, and a measurement sample suitable for cell analysis can be prepared by preparing the measurement sample based on the information on preparation of the measurement sample.

Information related to the preparation of the measurement sample also may include information on measurable measurement items and information on the test items, characteristics of the cell detection reagent used for cell analysis (including information on measurement items, information on particle labeling substances to label antibodies and the like, cross reactivity of the antibodies, measurement items which may be measured simultaneously and the like), the type of sample, the number of cells (necessary number of cells) required for cell analysis using each cell detection reagent, the ratio of the measurement target cells per sample amount, the amount of sample, the type of other reagents necessary for preparing the measurement sample, the dispensing amount of each reagent, the order of reagents to be dispensed, the temperature at reagent dispensing, the number of measurement samples (pipetting tubes 11) required for the measurement and the like.

The control unit 4 also is connected to the analysis unit 5 via a communication interface 7, and transmits and receives measurement data measured by the measurement unit 2 and data necessary for processing of each unit to and from the analysis unit 5.

Analysis Unit Structure

Figure 9:
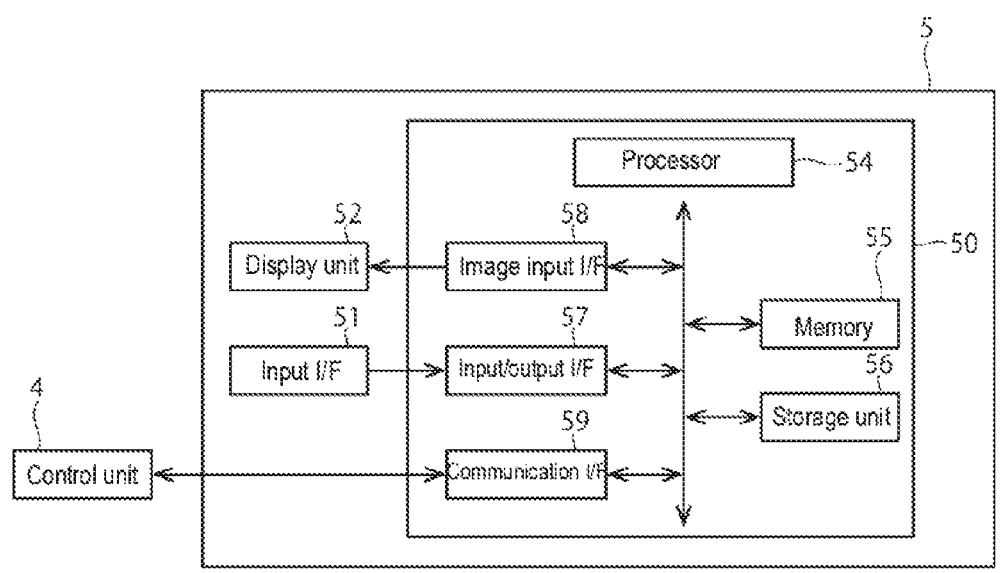
FIG. 9 is a block diagram of an analysis unit.

As shown in FIG. 9, the analysis unit 5 includes a processing unit 50, an input unit 51, and a display unit 52. The processing unit 50 includes a processor 54, a memory 55, a storage unit 56, an input/output interface 57, an image output interface 58, and a communication interface 59. The processing unit 50 can be configured by a general-purpose computer. The memory 55 is configured with a RAM (Random Access Memory). The memory 55 is used for reading out the computer program recorded in the storage unit 56. The memory 55 also is used as a work area for various data processing of the processor 54. The storage unit 56 is configured by a ROM (read only memory), a hard disk, and the like. The storage unit 56 records the computer program and various processing data used by the computer program. An operation program for sending operation commands to the control unit 4, receiving and analyzing the measurement data performed by the measurement unit 2, displaying processed analysis results and the like is installed in the storage unit 56 (for example, a hard disk).

The input unit 51 is configured by, for example, a touch panel, a keyboard, a mouse, a pen tablet, and the like. The display unit 52 is configured by, for example, a display or the like.

Control Unit Operations

Figure 10:
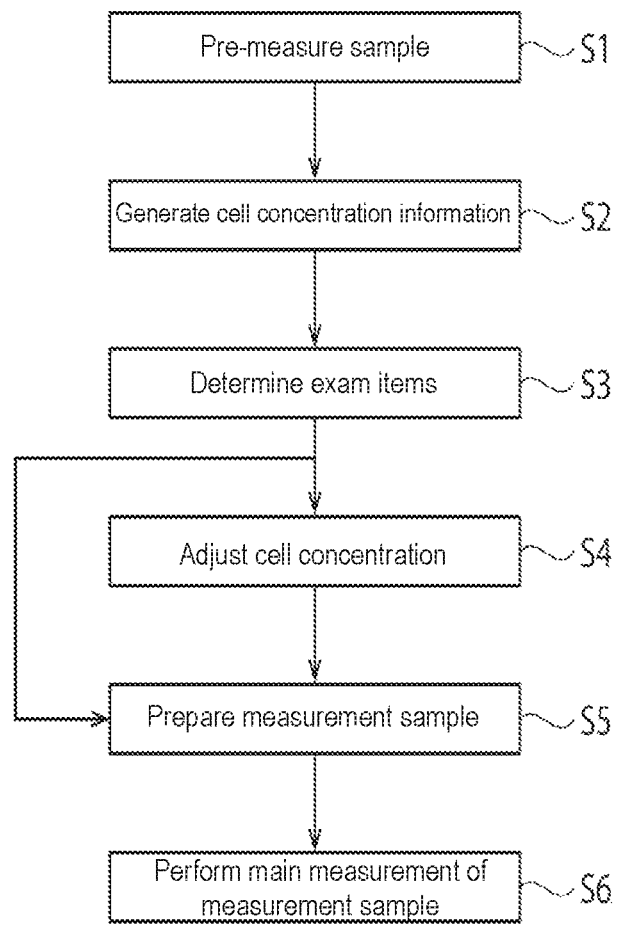
FIG. 10 is a flowchart showing a summary of an operation procedure of processing by a control unit.

As shown in FIG. 10, the control unit 4 performs processes including a pre-measurement step S1 for measuring a sample acquired from the sample container 10 and detecting measurement target cells in the sample, a generation step S2 of generating concentration information of the measurement target cells in the sample in the sample the sample container 10 based on the measurement data of the pre-measurement step, a determination step S3 of acquiring the information of the type of particle detection reagent used for preparing the measurement sample and determining the inspection item, an adjustment step S4 of automatically adjusting the concentration of measurement target cells in the sample in accordance with the type of the cell detection reagent used for preparation of the measurement sample (information related to the preparation of the measurement sample), a preparation step S5 for preparing a measurement sample from the sample and the cell detection reagent, and measurement step S6 for performing the main measurement of measurement sample. Details will be described below.

First Embodiment

A first embodiment of the operation of the control unit 4 will be described with reference to FIG. 11 and FIG. 12A. Note that the following flow is merely an example, and the embodiment is not limited to the following flow. The first embodiment is an example in which all of a plurality of cell detection reagents necessary for preparing a measurement sample for measuring each measurement item of a predetermined test item are mixed with a sample in one dispensing tube 11 to prepare the measurement sample.

Figure 11:
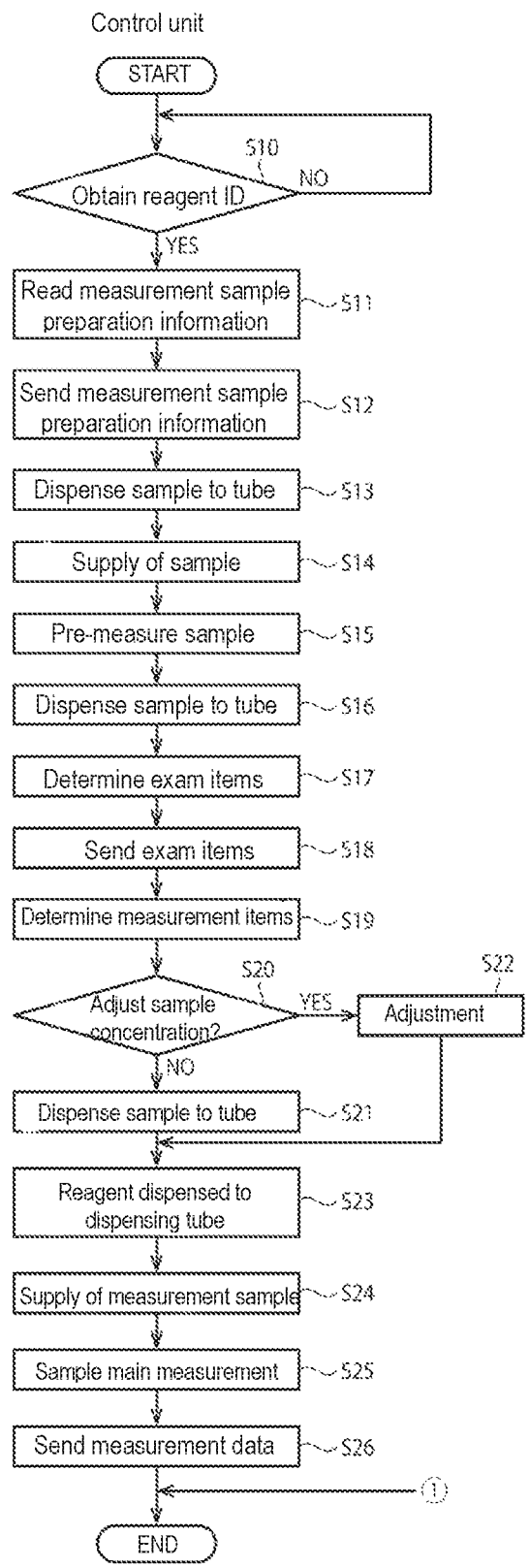
FIG. 11 is a flowchart showing an operation procedure of processing by a control unit.
Figure 12A:
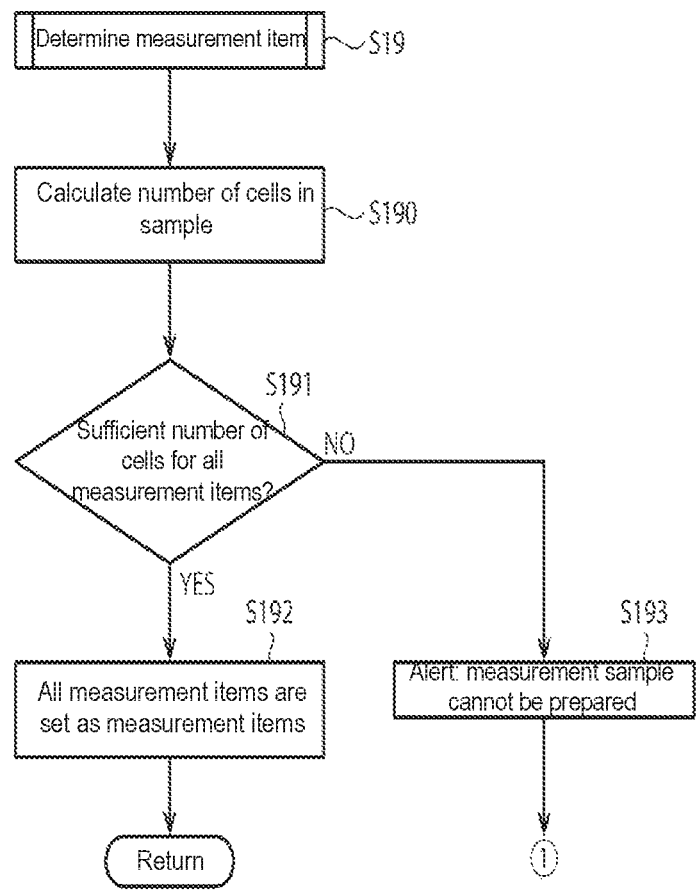
FIG. 12A is a flowchart showing the operation procedure of the process of a first example of S19 of FIG. 11.

First, in S10 of FIG. 11, the control unit 4 receives input of identification information (ID) of the cell detection reagent used for preparation of the measurement sample. Prior to the measurement, a plurality of cell detection reagents and reagents other than the cell detection reagent necessary for preparation of the measurement sample are set in the reagent setting unit 35 of the sample preparation unit 3. At this time, the receiving unit 39 of the reagent setting unit 35 acquires identification information (ID) of the reagent in the reagent container 350 from the barcode or the like attached to the reagent container 350. Upon receiving the identification information (ID) of each reagent, the control unit 4 determines the type of the particle detection reagent used for preparation of the measurement sample based on the identification information (ID), and proceeds to step S11 to read from the storage unit 42 the information relating to the preparation of the measurement sample of each measurement item corresponding to the test item to be tested using the cell detection reagent of the determined type. In S12, the control unit 4 also transmits the information relating to preparation of the read measurement sample to the analysis unit 5. Data indicating which reagent is set at which position in the reagent setting unit 35 also is recorded in the storage unit 42.

For example, FIG. 13A is an example of information related to preparation of a measurement sample recorded in the storage unit 42 in the example where the sample is peripheral blood and the examination item is regulatory T cell. CD25, CD3 and CD4 shown in FIG. 13A are cell surface markers, and cell detection reagents 2 and 3 contain antibodies binding to these cell surface markers, respectively. The antibody also is labeled with the fluorescent substance shown in FIG. 13A. FoxP3 is a nuclear protein, and cell detection reagent 4 contains a fluorescently labeled anti-FoxP3 antibody to the protein. In addition, the information concerning the preparation of the measurement sample in FIG. 13A includes information on the number of necessary cells, leukocytes necessary for performing cell analysis using each cell detection reagent 1 to 4, the amount of specimen, the type of other reagents required to prepare a measurement sample, the mixing amount of each reagent, the order of the reagents to be dispensed and the like.

Next, in S13, the control unit 4 controls the sample dispensing unit 30A to suction a part of the sample in the sample container 10 set in the sample container setting unit 31, by the nozzle 300, and discharge the suctioned sample to the dispensing tube 11. The sample may be discharged to the dispensing tube 11 set in the dispensing tube setting unit 32 or may be discharged into the dispensing tube 11 set in the centrifugal separation unit 38 by the tube transfer unit 36. Note that, if necessary, a predetermined amount of diluting liquid set in the reagent setting unit 35 is suctioned by the nozzle 300 of the reagent dispensing unit 30B, and discharged to the dispensing tube 11 into which the sample has been dispensed to be mixed therewith. The control unit 4 also calculates the liquid amount of the sample in the sample container 10 based on a detection signal from a liquid level detection sensor (not shown) employed as the liquid amount detection unit 37.

Next, in step S14, the control unit 4 controls the tube transfer unit 36 to transfer the dispensing tube 11 into which the sample has been dispensed to the measurement unit 2. When the dispensing tube 11 is transported to a predetermined position 29 (shown in FIG. 3) of the measurement unit 2, the sample is suctioned from the dispensing tube 11 by the suction unit 29a that can move up and down in the vertical direction (Z direction), and is supplied to the flow cell 20 of the measurement unit 2. In this way the control unit 4 measures the sample by flow cytometry analysis using the measurement unit 2 in S15, and counts the number of measurement target cells in the sample.

Next, in S16, the control unit 4 generates concentration information of the measurement target cells in the sample in the sample container 10 based on the measurement data of the measurement unit 2. Note that the concentration of measurement target cells in a sample refers to the number of cells to be measured contained in the sample per unit volume. Specifically, the amount of sample suctioned from the sample container 10 by the nozzle 300 of the sample dispensing unit 30A for sample measurement can be obtained from a flow rate sensor (not shown) provided in the sample dispensing unit 30A, and the concentration information of the measurement target cells in the sample can be generated by dividing the cell number (measurement data) of the measurement target cells counted by the measurement unit 2 by the suctioned sample volume.

Note that when the measurement unit 2 is a flow cytometer, the number of measurement target cells can be counted based on the detection signal of the forward scattered light. When the measurement unit 2 is a flow cytometer, the number of cells of the measurement target cell can be counted in consideration of the proportion of the measurement target cells in a plurality of kinds of cells included in the sample. Specifically, the ratio of the measurement target cells counted by the measurement unit 2 is added to the total number of cells counted by the measurement unit 2, and the number of measurement target cells and the concentration of the measurement target cells are calculated.

Next, in S17, the control unit 4 determines the test item. The determination of the test item is determined by specifying the test item including the identification information (ID) of each cell detection reagent by the identification information (ID) of the plurality of cell detection reagents acquired by the receiving unit 39 described above. For example, in the example shown in FIG. 13A, the test item A (regulatory T cell) is determined based on the identification information (ID) 1 to 4 of the cell detection reagents obtained by the receiving unit 39. In S18, the control unit 4 also transmits the determined test item to the analysis unit 5.

Note that the control unit 4 compares the concentration information of the measurement target cells in the sample generated in S16 with a reference value stored in the storage unit 42, and when the concentration of the measurement target cell is higher than the reference value, test items corresponding to another cell detection reagent group set in the reagent setting unit 35 also may be measured.

For example, when the sample is peripheral blood, the control unit 4 compares the concentration information of the measurement target cells (preferably nucleated cells) obtained by the preliminary measurement with the reference value of the number of the cells recorded in the storage unit 42. The reference value is about 15,000 cells/µl, for example, when the ample is peripheral blood. A hematopoietic tumor is suspected if the concentration of nucleated cells obtained by pre-measurement exceeds this value. Therefore, if it is determined that the concentration of the nucleated cells obtained by the preliminary measurement exceeds this value, the control unit 4 further controls the sample preparation unit 3 to prepare a measurement sample for adding an analysis item to identify hematopoietic tumor. The analysis item for identifying the hematopoietic tumor may be protein or nucleic acid.

Next, in S19, the control unit 4 determines whether measurement of all measurement items is possible. In step S19, the measurement target cells in the sample in the sample container 10 (the total number of cells) is calculated based on the concentration information of the measurement target cells in the sample generated in S16 and the sample amount in the sample container 10 calculated in S19 of FIG. 12. Next, in step S191, the control unit 4 determines whether the calculated number of measurement target cells in the sample is equal to or larger than the number of cells sufficient for measurement of all the measurement items of the test item.

Figure 14:
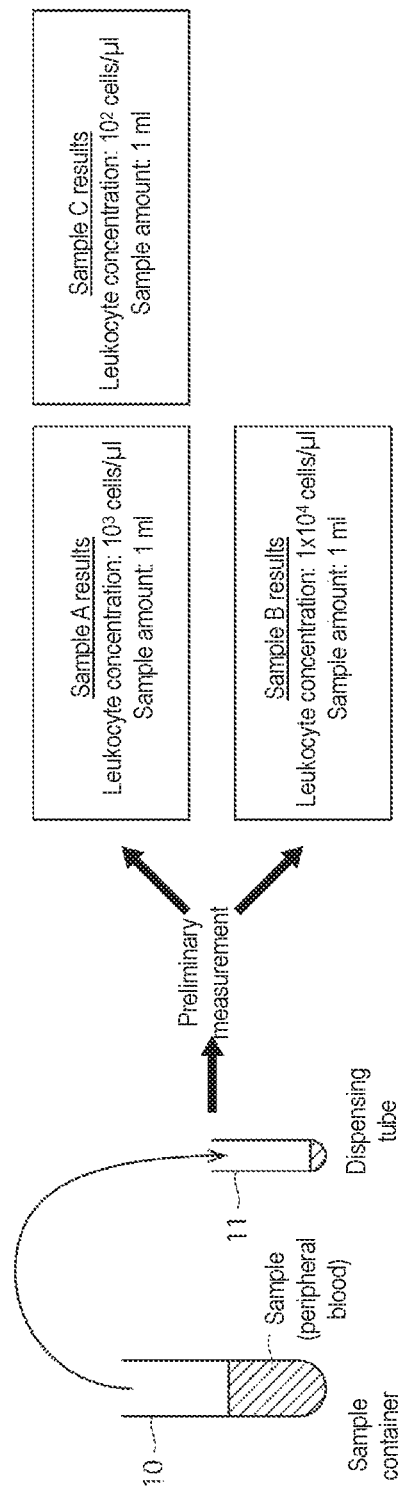
FIG. 14 is a diagram showing an example of measurement data obtained by measuring a sample in a sample container and detecting measurement target particles in the sample.
Figure 16:
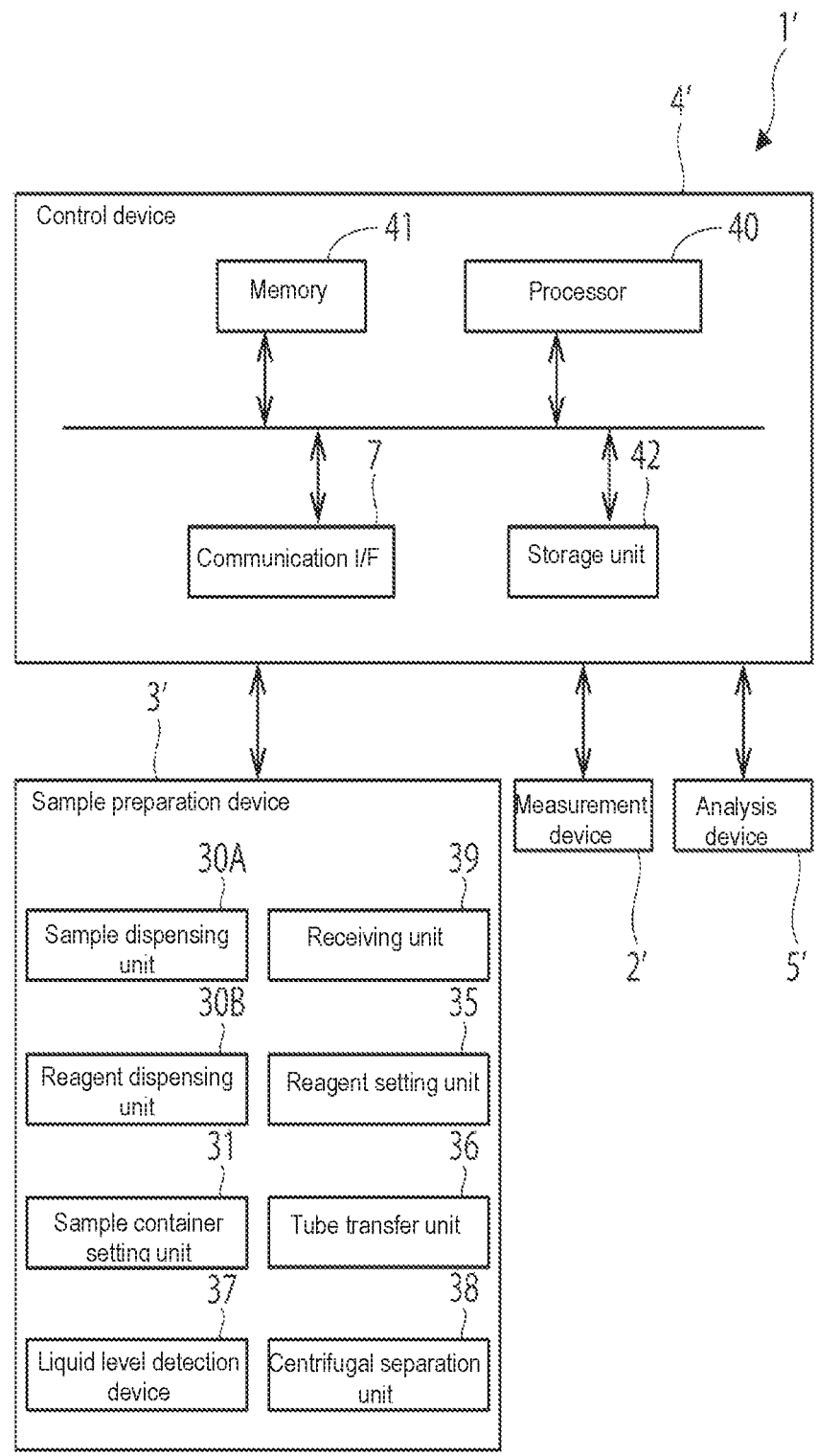
FIG. 16 is a block diagram of a sample preparation system.

For example, in the example of FIG. 13A, the white blood cell count necessary for measurement of regulatory T cells is, for example, $1\times10^4$. Here, as shown in FIG. 14, the leukocyte concentration of sample A is $1\times10^3$/Ml from result of the pre-measurement of the sample, and when the sample volume is 1 ml, the number of measurement target cell leukocytes in the sample A is $1\times10^6$, therefore, sample A satisfies the measurement conditions of all the measurement items. Since the number of measurement target cell leukocytes in sample B is $1\times10^7$ cells and $1\times10^5$ cells, samples B and C satisfy the measurement conditions of all the measurement items. Therefore, in this case, S191 in FIG. 12A becomes "YES" and proceeds to S192, the control unit 4 determines all measurement items as measurement items. The determination result also is recorded in the storage unit 42 and transmitted to the analysis unit 5, and the process proceeds to S20 of FIG. 11.

On the other hand, although not shown in the figure, the measurement condition of the measurement item using the cell detection reagent 4 will not be satisfied when the number of leukocytes which are measurement target cells in the sample is less than $1\times10^4$. In this case, "NO" is obtained in S191 of FIG. 12A and the flow advances to S193, and a notice that the number of cells necessary for measuring the measurement item cannot be ensured and a measurement item can not be measured is sent to the analysis unit 5.

In the case where the number of measurement target cells in the sample is equal to or larger than the number of cells sufficient for measurement of all the measurement items, the number of measurement target cells in the sample also can be rendered equal to or greater than the number of cells sufficient for measurement of all measurement items by adding the sample, the sample is concentrated by the centrifugal separation unit 38 to newly sample the sample by concentrating the sample in the centrifugal separation unit 38 and mixing a new sample.

Next, in S20 of FIG. 11, the control unit 4 determines whether concentration adjustment of the sample is necessary. Whether the concentration adjustment of the sample is necessary is determined according to the concentration information of the measurement target cells in the sample generated in S16 and the particle detection reagent used for preparation of the measurement sample, and concentration adjustment is deemed necessary when the concentration of the measurement target cells in the sample is larger than a predetermined value or smaller than a predetermined value. On the other hand, when the concentration of the measurement target cells in the sample is equal to a predetermined value, it is determined that concentration adjustment is unnecessary. The predetermined value may be a fixed value or may have a certain range.

In the example of FIG. 13A, for example, since the number of white blood cells necessary for measurement of regulatory T cells is $1\times10^4$ cells and the amount of sample is 10 µl, the leukocyte concentration as the measurement target cells in the sample of the above-mentioned predetermined value becomes $1\times10^3$ cells/µl. Here, as shown in FIG. 14, concentration adjustment is deemed not required as a result of the pre-measurement of the sample, since the leukocyte concentration of sample A is $1\times10^3$/Ml, the leukocyte concentration of sample B is $1\times10^4$/Ml, the leukocyte concentration of sample C is $1\times10^2$/Ml. On the other hand, in sample B the leukocyte concentration is larger than the predetermined value, and in sample C the leukocyte concentration is smaller than the predetermined value, so it is determined that concentration adjustment is necessary.

Note that the proportion of measurement target cells in the sample may be low depending on the measurement item. For example, this example is a hematopoietic stem cell (measurement target cell) in the bone marrow. In this case, whether concentration adjustment of the sample is necessary is determined according to the information of the ratio of the measurement target cells contained in a certain fixed amount of sample contained in the cell detection reagent. Concentration adjustment of the sample in this case may be performed by centrifugal separation to be described later. When the flow cytometer is provided with a sorting function, the measurement target cells also may be collected and concentrated from the sample using the sorting function.

When it is determined in S20 of FIG. 11 that concentration adjustment of the sample is unnecessary, the control unit 4 proceeds to S21 and controls the sample dispensing unit 30A to suction a predetermined sample volume by the nozzle 300, and discharge the suctioned sample into the dispensing tube 11. Then, the control unit 4 controls the tube transfer unit 36 to set the dispensing tube 11 holding the dispensed sample in the centrifugal separation unit 38 of the sample preparation unit 3, and then in S23, the reagent dispensing unit 30B is controlled to dispense cell detection reagent and reagent other than the cell detection reagent to the dispensing tube 11 in order to prepare the measurement based on information relating to preparation of the measurement sample.

Specifically, the control unit 4 controls the operations of sample preparation (dispensing, diluting, washing and the like) by the sample preparation unit 3 based on the type of the cell detection reagent necessary for preparing the measurement sample, the type of the reagent other than the cell detection reagent necessary for preparation of the measurement sample, the order of dispensing each reagent, the dispensing amount of each reagent, the amount of sample and the like included in the information related to preparation of the measurement sample Upon preparation of the measurement sample, the control unit 4 also may control the centrifugal separation unit 38 as necessary to perform centrifugal separation, and control the reagent dispensing unit 30B so as to remove the supernatant in the dispensing tube 11. Information relating to the temperature at the time of dispensing each reagent also may be included in the information on the preparation of the measurement sample, and the control unit 4 controls the temperature adjustment unit 398, convection generating units 399a and 399b to adjust the temperature of the centrifugal separation unit 38 when dispensing each reagent based on the information relating to the temperature at the time of dispensing each reagent included in the information on the preparation of the measurement sample.

For example, when describing sample A in FIG. 14 as an example, the control section 4 controls the sample dispensing unit 30A to dispense part of sample A from container 10 to another dispensing tube 11 that is different from the dispensing tube 11 used in the premeasurement as shown in FIG. 15 (a). The amount of sample to be dispensed into the dispensing tube 11 satisfies the required number of cells if 10 µl of sample A is dispensed into the dispensing tube 11 for preparation of the measurement sample since the number of white blood cells necessary for measurement of regulatory T cells is $1\times10^4$ as shown in FIG. 13A, and the leukocyte concentration of sample A is $10^3$/Ml.

Next, the control unit 4 controls the tube transfer unit 36 to transfer and set the dispensing tube 11 containing sample A to the centrifugal separation unit 38 of the sample preparation unit 3. When analyzing regulatory T cells using peripheral blood as a sample in accordance with information relating to the preparation of the measurement sample shown in FIG. 13A, it is preferable to first hemolyze the erythrocytes, so that the control unit 4 performs reagent dispensing of 5 µl of hemolytic agent set in the reagent setting unit 35 into the dispensing tube 11 containing sample A under the control of the unit 30B. Subsequently, the control unit 4 controls the reagent dispensing unit 30B to dispense 10 µl of the cell detection reagent 2 set in the reagent setting unit 35, and 5 µl of cell detection reagent 3 into dispensing tube 11 containing sample according to the information relating to preparation of the measurement sample shown in FIG. 13A. Subsequently, the control unit 4 controls the reagent dispensing unit 30B to dispense 10 µl of cell membrane penetrating agent is set in the reagent setting unit 35 in the dispensing tube 11 containing the cells reacted with the cell detection reagent 2 and the cell detection reagent 3. Then, the control unit 4 controls the reagent dispensing unit 30B to dispense 10 µl of the cell detection reagent 4 set in the reagent setting unit 35 to the dispensing tube 11 in which 10 µl of the cell membrane penetrating agent has been mixed. Finally, the control unit 4 controls the reagent dispensing unit 30B to dispense 5 µl of the cell detection reagent 1 set in the reagent setting unit 35 to the dispensing tube 11 in which cell detection reagent 4 was mixed. Note that the cell detection reagent 1 is a nuclear stain.

In the example of FIG. 15 (a), it is preferable to incubate for 15 to 30 minutes in order to sufficiently react the cells with the antibody after each cell detection reagent is dispensed. After the incubation, the cells also may be washed before dispensing the next cell detection reagent. The washing method is not limited; for example, centrifugal separation of the dispensing tube 11 containing the cells may be performed by the centrifugal separation unit 38 to remove of the supernatant, and diluting liquid or the like may be added to resuspend the cells.

Then, in S24, the control unit 4 transfers the dispensing tube 11 containing the measurement sample prepared as described above to the measurement unit 2 under the control of the tube transfer unit 36. When the dispensing tube 11 is transported to a predetermined position 29 (shown in FIG. 3) of the measurement unit 2, the measurement sample is discharged from the dispensing tube 11 by the suction unit 29a that can move up and down in the vertical direction (Z direction), and the sample supplied to the flow cell 20 of the measurement unit 2. In this way the control unit 4 performs the main measurement of the measurement sample by the flow cytometry method using the measurement unit 2 in S25.

On the other hand, in S20, when the control unit 4 determines that concentration adjustment of the sample is necessary, the control unit 4 proceeds to S22 and adjusts the concentration of the sample in the sample container 10. Specifically, when the concentration of the measurement target cells in the sample is larger than the predetermined value, the control unit 4 can make the concentration of the measurement target cells in the sample a predetermined value by diluting the sample.

Referring to the example of sample B in FIG. 14, the control unit 4 controls the sample dispensing unit 30A so that the sample dispensing tube 11 dispenses part of the sample B from the sample container 10, as shown in FIG. 15 (b). The amount of sample dispensed into the dispensing tube 11 can satisfy the required number of cells if 1 µl of sample B is dispensed into dispensing tube 11 for preparing a measurement sample since the leukocyte count required for measurement of regulatory T cells is $1\times10^4$ and the leukocyte concentration of sample B is $1\times10^4$/Ml, as shown in FIG. 13A. Then, the leukocyte concentration of sample B can be set as the predetermined value by diluting 10-fold with diluting liquid to make the amount of sample B 10 µl since the leukocyte concentration in sample B is 10-fold higher than the predetermined value of $1\times103$ cells/µl.

The control unit 4 also concentrates the sample when the concentration of the measurement target cells in the sample is smaller than a predetermined value. Concentration of the sample can be performed, for example, by centrifugal separation by the centrifugal separation unit 38. The concentration of the measurement target cells in the sample can be set to a predetermined value by concentrating the sample.

Referring sample C in FIG. 14 as an example, the control unit 4 controls the sample dispensing unit 30A to dispense part of sample C from the sample container 10 to another dispensing tube 11 for pre-measurement, as shown in FIG. 15 (c). The amount of sample to be dispensed into the dispensing tube 11 satisfies the required number of cells if 100 µl of sample B is dispensed into the dispensing tube 11 for preparation of the measurement sample since the number of leukocytes necessary for measurement of regulatory T cells is $1\times10^4$ cells, and the leukocyte concentration of sample C is $1\times10^2$/µl. Then, the control unit 4 controls the centrifugal separation unit 38 to centrifugally separate sample C and the reagent dispensing unit 30B to suction and remove the supernatant from the dispensing tube 11, and mix the dilution liquid and sample to 10 µl to set the leukocyte concentration to a predetermined value. Note that in this case it is preferable to concentrate red blood cells after hemolysis.

When the concentration adjustment of the sample is completed the process continues to S23 of FIG. 11, and the reagent dispensing unit 30B is controlled based on the information relating to the preparation of the measurement sample, and cell detection reagent and reagent other than the cell detection reagent are dispensed into the dispensing tube 11 to prepare a measurement sample. Then, in S24, the control unit 4 controls the tube transfer unit 36 to transport the dispensing tube 11 containing the prepared measurement sample to the measurement unit 2, and in S25 In S25, the main measurement of the measurement sample is performed by the measurement unit 2 by flow cytometry.

Then, in S26, the control unit 4 transmits the measurement data of the main measurement from the measurement unit 2 to the analysis unit 5. The processing unit 50 of the analysis unit 5 analyzes the sample using the measurement data of this measurement, and determines whether there is an abnormality in the measurement target cells in the sample.

Second Embodiment

Figure 12B:
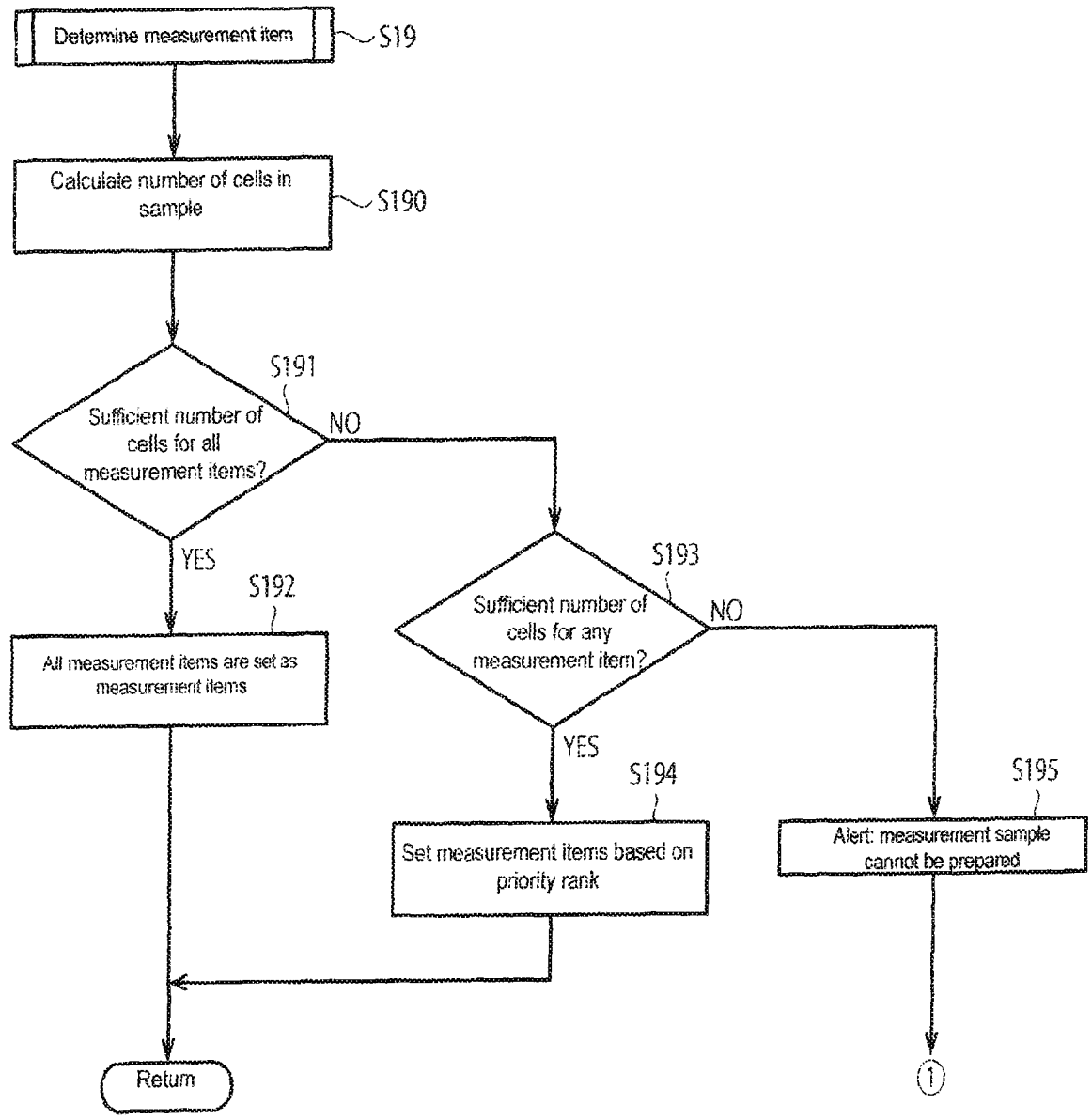
FIG. 12B is a flowchart showing the operation procedure of the process of a second example of S19 of FIG. 11.

A second embodiment of the operation of the control unit 4 will be described with reference to FIG. 11 and FIG. 12B. Note that the following flow is merely an example, and the embodiment is not limited to the following flow. The second embodiment is an example in which measurement samples for measuring each measurement item of a predetermined test item are prepared with different dispensing tubes 11. FIG. 13B is an example of information related to the preparation of the measurement sample recorded in the storage unit 42 of the control unit 4 in the second embodiment. In the second embodiment, four kinds of measurement samples (measurement samples 1 to 4) are prepared by mixing cell detection reagents 2 to 5 as cell detection reagents with samples by separate dispensing tubes 11, respectively, and the operation in this case will be described. Note that the same operation is performed when preparing measurement samples other than three types.

First, S10 to S18 of FIG. 11 are the same as those of the first embodiment, so detailed description thereof will be omitted here.

Next, the control unit determines measurement items in S19. In S190 of FIG. 12B, the number of measurement target cells in the sample in the sample container 10 (total number of cells) is calculated based on the concentration information of the measurement target cells in the sample generated in S16 and the sample amount in the sample container 10. Next, in step S191, the control unit 4 determines whether the calculated number of measurement target cells in the sample is equal to or larger than the number of cells sufficient for measurement of all the measurement items of the test item. The number of cells necessary for measurement of this measurement item is obtained from information relating to preparation of the measurement sample.

In the example of FIG. 13B, since the leukocyte count necessary for measurement of regulatory T cells is $5\times10^3$ cells in the measurement item using the cell detection reagent 2, $1\times10^3$ cells in the measurement item using the cell detection reagent 3, $1\times10^3$ cells in the measurement item using the cell detection reagent 4, and $10\times10^3$ cells in the measurement item using the cell detection reagent 5, a total of $17\times10^3$ cells are required. As shown in FIG. 14, as a result of the pre-measurement of the sample it is known that the leukocyte concentration of sample A is $1\times10^3$/Ml, the sample volume is 1 ml, and the number of leukocyte measurement target cells in the sample A is $1\times10^6$, so sample A satisfies the measurement conditions of all the measurement items. The number of leukocyte measurement target cells in the sample B is $1\times10^7$ cells and $1\times10^5$ cells, respectively, so that the samples B and C satisfy the measurement conditions of all the measurement items. Therefore, S191 becomes "YES" and the flow advances to S192, and the control unit 4 determines the measurement items of all the measurement items. The determination result also is recorded in the storage unit 42 and transmitted to the analysis unit 5, and the process proceeds to S20 of FIG. 11.

On the other hand, although not shown in the figure, the number of leukocyte measurement target cells in the sample will not satisfy the measurement conditions of all measurement items when, for example, the number of leukocyte measurement target cells is less than $16 \times 10^3$ cells. In this case, in S191, the control unit 4 determines that the number of measurement target cells in the sample is not a sufficient amount for measurement of all the measurement items, and the process proceeds to S193.

Next, in step S191, the control unit 4 determines whether the number of measurement target cells in the sample is equal to or larger than the number of cells sufficient for measurement of all the measurement items of the test item. In the example of FIG. 13B, when the number of leukocyte measurement target cells in the sample is, for example, $16 \times 10^3$ cells, the determination is "YES" in S193, the process proceeds to S194, and the control unit 4 determines the measurement items to be measured based on the number of measurement target cells in the sample and the order of priority of the measurement items that are given priority when the number of cells included in the information on preparation of the measurement sample is insufficient. That is, it is determined whether the number of cells satisfying the measurement condition of the measurement item can be ensured in descending order of priority, and the measurement item that can ensure the number of cells satisfies the measurement condition is determined as the measurement item. The priority order for determining this measurement item is obtained from information relating to the preparation of the measurement sample.

In the example of FIG. 13B, when the number of leukocyte measurement target cells in the sample is, for example, $16 \times 10^3$ cells, the measurement item using the cell detection reagent 5 having the first priority is determined first. The number of cells necessary for measuring the first measurement item is $10 \times 10^3$ cells, so that the measurement condition of the measurement item is satisfied. Next, the measurement item using the cell detection reagent 2 having the second highest priority is determined; since the number of cells necessary for the measurement of the second measurement item is $5 \times 10^3$ cells, and the remaining number of leukocyte measurement target cells in the sample is $6 \times 10^3$, the measurement condition of the measurement item is satisfied. Next, the measurement item using the cell detection reagent 4 with the third priority is determined; since the number of cells necessary for the measurement of the third measurement item is $1 \times 10^3$ cells, and the remaining number of leukocyte measurement target cells in the sample is $1 \times 10^3$, the measurement condition of the measurement item is satisfied. Finally, the measurement item using the cell detection reagent 3 with the fourth priority is determined; since the number of cells necessary for the measurement of the fourth measurement item is $1 \times 10^3$ cells, and the number of remaining white blood cells in the sample in the sample is 0, the measurement condition of the measurement item is not satisfied. Therefore, in this case, the control unit 4 determines the measurement items using the cell detection reagents 2, 4, and 5 as measurement items. The determination result also is recorded in the storage unit 42 and transmitted to the analysis unit 5, and the process proceeds to S20 of FIG. 11.

On the other hand, if it is determined in S193 that the number of measurement target cells in the sample is not sufficient for all measurement items, the control unit 4 proceeds to S195 and determines the number of cells necessary for measuring the measurement item is not ensured and notifies the analyzing unit 5 that a measurement sample can not be prepared.

Next, in S20 of FIG. 11, the control unit 4 determines whether concentration adjustment of the sample is necessary. In the second embodiment as shown in the example of FIG. 13B, the concentration of the measurement target cells (leukocytes) in the sample used for the preparation is different for each measurement item; the predetermined value of the leukocyte concentration of the sample required for the measurement item using cell detection reagent 2 is $5 \times 10^2$ cells/μl, the predetermined value of the leukocyte concentration of the sample required for the measurement item using the cell detection reagent 3 is $1 \times 10^2$ cells/μl, the leukocyte concentration of the sample required for the measurement item using the cell detection reagent 4 is $1 \times 10^2$ cells/μl, and the predetermined value of the leukocyte concentration of the sample required for the measurement item using the cell detection reagent 5 is $1 \times 10^3$ cells/μl. Therefore, whether concentration adjustment is necessary based on the concentration information of the measurement target cells in the sample is determined for each measurement item generated in S16, and when the concentration of the measurement target cells in the sample is larger than the predetermined value or smaller than the predetermined value, the control unit 4 determines that concentration adjustment is necessary, and the process continues to S22. Note that since the method of S22 concentration adjustment is the same as that of the first embodiment, a detailed description thereof will be omitted. On the other hand, when the concentration of the measurement target cell in the sample is the predetermined value, the control unit 4 determines that concentration adjustment is unnecessary, and proceeds to S21.

In S21, the control unit 4 controls the sample dispensing unit 30A to suction a predetermined sample amount of sample for each measurement item by the nozzle 300, and discharges the sample into each dispensing tube 11. Then, the control unit 4 controls the tube transfer unit 36 to set the dispensing tubes 11, into which the samples are dispensed, in the centrifugal separation unit 38 of the sample preparation unit 3, and in S23 controls the reagent dispensing unit 30B based on the information relating to preparation of the measurement sample, and discharges cell detection reagent and reagent other than cell detection reagent into the dispensing tubes 11 for each measurement item to prepare the measurement sample.

In the case of preparing a measurement sample by mixing a plurality of cell detection reagents with samples by separate dispensing tubes 11 as in the second embodiment, the control unit 4 controls the sample dispensing unit 30A to dispense sample to each dispensing tube 11 to attain the required number of cells corresponding to the cell detection reagents 2 to 5, respectively. Next, the control unit 4 controls the tube transfer unit 36 to transfer and set each of the dispensing tubes 11 containing the sample in the centrifugal separation unit 38 of the sample preparation unit 3. Subsequently, the control unit 4 controls the reagent dispensing unit 30B to dispense 5 μl of the hemolytic agent set in the reagent setting unit 35 to each dispensing tube 11 containing the sample. In addition to the hemolytic agent, 10 μl of the cell penetrating agent set in the reagent setting section 35 is also dispensed into the dispensing tube to which the cell detection reagent 5 was dispensed under the control of the reagent dispensing unit 30B. Subsequently, the control unit 4 controls the reagent dispensing unit 30B to dispense cell detection reagent 2 to 5 set in the reagent setting unit 35 to each dispensing tube 11 containing the sample. The control unit 4 also controls the reagent dispensing unit 30B to dispense the nuclear staining solution (cell detection reagent 1) set in the reagent setting unit 35 to all the dispensing tubes.

Then, in S24, the control unit 4 transfers all the dispensing tubes 11 containing the measurement samples prepared as described above to the measurement unit 2 under the control of the tube transfer unit 36. In this way the control unit 4 performs the main measurement of the measurement samples by the flow cytometry method using the measurement unit 2 in S25.

As described above, according to the sample preparation apparatus 1, the sample preparation method, and the particle analyzer 100 of the above embodiments, pre-measurement is performed on the sample, concentration information of the measurement target cells in the sample is generated based on the measurement data, and the concentration of the measurement target particles in the sample is adjusted according to the generated concentration information and the cell detection reagent used for preparing the measurement sample based on this measurement, and the sample preparation unit 3 prepares the measurement sample. Therefore, it is possible to efficiently prepare a measurement sample including the measurement target cells at a concentration suitable for the cell detection reagent, and it is possible to analyze the measurement target cells in the sample with high accuracy.

The operation conditions (the amount of the sample, the type of the cell detection reagent and other reagents necessary for preparation of the measurement sample, the dispensing order, the dispensing amount and the like) are controlled based on the information related to the preparation of the measurement sample used for preparing the measurement sample. Therefore, preparation of the measurement sample can be automated.

Other Modifications

Although the embodiment of the particle analyzer has been described above, the present invention is not limited to the above-described embodiment, and various modifications are possible without departing from the spirit of the present invention.

For example, although the measurement unit 2 has a function of pre-measuring a sample containing particles before sample preparation and detecting the measurement target particles contained in the sample, and a function of performing a main measurement of the measurement sample and detecting information related to characteristics of the measurement target cells for cell analysis by the analyzer 5 in the above embodiment, the function of pre-measuring the sample alone also may be provided. In this case, in the particle analyzer 1, a main measurement unit (second measurement unit) such as a flow cytometer or the like for performing a main measurement of the measurement sample, and a measurement unit 2 (first measurement unit) for measuring a sample and detecting measurement target particles in the sample may be provided in particle analyzer 1. Although the second measuring unit may be included in the sample preparation apparatus 1, or may be provided separately from the sample preparation apparatus 1, in which case, a flow cytometer configured as shown in FIG. 2 also may be used as the measurement unit 2, since the measuring unit 2 is capable of outputting a signal for detecting the measurement target particles contained in the sample, a light receiving element for acquiring the forward scattered light may be provided without a light receiving element for acquiring the side scattered light and side fluorescent light inasmuch as acquiring the forward scattered light is sufficient. The measurement unit 2 also is not limited to optical particle measurement such as a flow cytometer, and may be an electric resistance type particle measurement, a precipitation type particle measurement.

In the above-described embodiment, the centrifugal separation unit 38 of the sample preparation unit 3 functions as a concentration adjustment unit, but the specific configuration for concentration adjustment is not particularly limited, and a filter, a cell sorter, or the like also may be used.

Although the sample preparation unit 3 includes the centrifugal separation unit 38, and the measurement sample is prepared by the centrifugal separation unit 38 in the above embodiment, the specific configuration for preparing the measurement sample is not particularly limited inasmuch as the measurement sample can be prepared automatically.

In the above embodiment, The sample test items and measurement items are decided based on information relating to the cell detection reagent set in the reagent setting unit 35 by the receiving unit 39 installed in the reagent setting unit 35 of the sample preparation unit 3. However, information specifying measurement items also may be acquired by providing a receiving unit such as a barcode reader or RFID reader or the like capable of reading a barcode or the like in the sample container setting unit 31 and affixing a barcode, tag or the like containing information specifying measurement items on the sample container 10, so that information specifying the measurement item can be acquired by reading the barcode or the like attached to the sample container 10. The information for specifying the measurement item is not limited insofar as it can specify the measurement item, and may be, for example, the name of the measurement item, identification information or name of the reagent necessary for measuring the measurement item and the like.

In the above-described embodiments, the control unit 4 also may determine the number of measurement samples to be prepared by the sample preparation unit 3 based on the type of the particle detection reagent used for preparing the measurement sample and the number of measurement target particles in the sample in the sample container. For example, information relating to the number of measurement samples (dispensing tubes 11) required for a measurement can be included in the information relating to the preparation of measurement sample, and the control unit 4 may control the measurement sample preparation unit 3 to prepare a predetermined number of measurement samples based on information related to the number of measurement target cells in the sample in the sample container 10 and the number of measurement samples (dispensing tubes 11) required for the measurement included in the information relating to the preparation of the measurement sample.

In the above-described embodiment, the sample preparation apparatus 1 is configured as one device integrally incorporating the measurement unit 2, the sample preparation unit 3, and the control unit 4. However, in addition to the above embodiments, the invention also may be a sample preparation system 1 in which the measurement unit 2, sample preparing unit 3 and control unit 4 are independent devices configured as measurement device 2', sample preparation device 3' and control device 4', such that the measurement device 2', sample preparation device 3', and analyzer 5' are the sample preparation system connected to the control device 4. Note that the measurement device 2', the sample preparation device 3', the control device 4', and the analyzer 5' have the same or substantially the same configuration as the measurement unit 2, the sample preparation unit 3, the control unit 4 and the analyzer 5 in FIG. 1. In this case, the signal processing unit 6 in FIG. 1 is included in the measurement device 2', and the communication I/F is included in each of the devices 2' to 5'.

What is claimed is:

1. A sample preparation apparatus comprising:
   a measurement unit configured to detect target particles contained in a first quantity of a sample acquired from a sample container;
   a sample preparation unit configured to prepare a measurement sample from a second quantity of the sample;
   a control unit configured to:
   receive an identification of a type of particle detection reagent to be mixed with the second quantity of the sample;
   using the received identification of the type of particle detection reagent, determine a target concentration of the target particles prescribed to properly measure a marker attached to the target particles;
   operate the measurement unit to detect the target particles contained in the first quantity of the sample;
   from the target particles in the first quantity of the sample detected by the measurement unit, determine a sample concentration of the target particles in the first quantity of the sample;
   operate the sample preparation unit to adjust the second quantity of the sample, based on the determined sample concentration of the target particles in the first quantity of the sample, to have the target particles at the target concentration; and
   operate the sample preparation unit to mix the type of particle detection reagent with the second quantity of the sample, adjusted to have the target particles at the target concentration, to prepare the measurement sample, wherein the measurement sample is used to detect the marker attached to the target particles.

2. The sample preparation apparatus of claim 1, wherein the control unit is configured to further determine an amount of the type of particle detection reagent to be mixed with the second quantity of the sample, using the identification of the type of particle detection reagent.

3. The sample preparation apparatus of claim 1, wherein the control unit is configured to control the sample preparation unit to adjust the second quantity of the sample to have the target particles at the target concentration by concentrating or diluting the second quantity of the sample.

4. The sample preparation apparatus according to claim 1, wherein the sample preparation unit comprises a concentration adjusting unit configured to adjust the second quantity of the sample to have the target particles at the target concentration, and a reagent dispensing unit configured to mix the type of particle detection reagent with the second quantity of the sample adjusted to have the target particles at the target concentration.

5. The sample preparation apparatus according to claim 4, wherein the concentration adjusting unit includes a centrifugal separation unit or a cell sorter.

6. The sample preparation apparatus according to claim 1, wherein the measurement unit comprises a flow cell, a light source that irradiates light on the sample passing through the flow cell, and a light receiver that detects optical information of the target particles in the sample and converts the optical information into an electric signal.

7. The sample preparation apparatus according to claim 6, wherein the measurement unit is supplied with the measurement sample prepared by the sample preparation unit, and performs measurements on the measurement sample.

8. The sample preparation apparatus according to claim 1, wherein the sample preparation unit comprises a sample dispensing unit configured to suction the sample from the sample container,
the measurement unit is configured to measure a part of the suctioned sample, and
the sample preparation unit is configured to prepare the measurement sample from another part of the suctioned sample.

9. The sample preparation apparatus according to claim 1, further comprising a storage unit configured to store instructions on preparation of the measurement sample, each instruction being associated with a type of particle detection reagent, wherein the control unit is configured to read an instruction from the storage unit and control the sample preparation unit to prepare the measurement sample using the type of particle detection reagent associated with the read instruction.

10. The sample preparation apparatus according to claim 9, wherein the read instruction comprises an amount of the associated type of particle detection reagent required to prepare the measurement sample, an amount of the second quantity of the sample mixed with the associated type of particle detection reagent, and a number of the target particles in the second quantity of the sample mixed with the associated type of particle detection reagent.

11. The sample preparation apparatus according to claim 9, wherein the sample preparation unit is configured to prepare the measurement sample from the second quantity of the sample adjusted to have the target particles at the target concentration and mixed with a plurality of types of particle detection reagents,
the instruction on the preparation of the measurement sample stored in the storage unit comprises a sequence to add the plurality of types of particle detection reagents to the second quantity of the sample, and
the control unit is configured to control the sample preparation unit to mix the plurality of types of particle detection reagents with the second quantity of the sample according to the sequence.

12. The sample preparation apparatus according to claim 1, wherein the control unit is configured to calculate a number of the target particles contained in the second quantity of the sample from an amount of the second quantity of the sample and the sample concentration of the target particles, and
the control unit is configured to determine a number of sets of measurement samples preparable from the second quantity of the sample by the sample preparation unit, based on types of particle detection reagents and the calculated number of target particles in the second quantity of the sample.

13. The sample preparation apparatus according to claim 1, further comprising a reception unit that receives the identification of the type of particle detection reagent to be used to prepare the measurement sample.

14. The sample preparation apparatus according to claim 13, wherein the control unit is configured to determine the type of particle detection reagent to be used to prepare the measurement sample, using the identification of the type of particle detection reagent received by the reception unit.

15. The sample preparation apparatus according to claim 1, wherein the control unit is configured to determine the type of particle detection reagent to be used to prepare the measurement sample, based on the marker to be detected by the measurement unit.

16. The sample preparation apparatus according to claim 15, wherein the control unit is configured to determine the marker based on the sample concentration of the target particles.

17. The sample preparation apparatus according to claim 1, wherein the target particles are cells.

18. The sample preparation apparatus according to claim 11, wherein the plurality of types of particle detection reagents comprise a first particle detection reagent and a second particle detection reagent,
the first particle detection reagent comprises a first fluorescent substance whose excitation wavelength is a first wavelength, and
the second particle detection reagent comprises a second fluorescent substance whose excitation wavelength is a second wavelength which is different from the first wavelength.

19. A sample preparation method, comprising:
receiving an identification of a type of particle detection reagent to be mixed with a sample that include target particles;
measuring a sample concentration of the target particles in a first quantity of the sample;
using the received identification of the type of particle detection reagent, determining a target concentration of the target particles prescribed to properly measure a marker attached to the target particles:
adjusting a second quantity of the sample, from the sample concentration of the target particles in the first quantity of the sample, to have the target particles at the target concentration; and
mixing the type of particle detection reagent with the second quantity of the sample, which includes the target particles at the target concentration, to prepare a measurement sample.

20. A sample preparation system comprising the sample preparation apparatus according to claim 1.

* * * * *